US008832371B2

(12) United States Patent
Uehara et al.

(10) Patent No.: US 8,832,371 B2
(45) Date of Patent: Sep. 9, 2014

(54) STORAGE SYSTEM WITH MULTIPLE FLASH MEMORY PACKAGES AND DATA CONTROL METHOD THEREFOR

(75) Inventors: Go Uehara, Odawara (JP); Koji Sonoda, Chigasaki (JP); Junji Ogawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 111 days.

(21) Appl. No.: 13/125,618

(22) PCT Filed: Apr. 4, 2011

(86) PCT No.: PCT/JP2011/001997
§ 371 (c)(1),
(2), (4) Date: Apr. 22, 2011

(65) Prior Publication Data
US 2012/0254513 A1 Oct. 4, 2012

(51) Int. Cl.
G06F 12/00 (2006.01)
G06F 13/00 (2006.01)
G06F 13/28 (2006.01)
G06F 11/10 (2006.01)
G06F 12/02 (2006.01)
G06F 3/06 (2006.01)

(52) U.S. Cl.
CPC .............. *G06F 3/064* (2013.01); *G06F 11/108* (2013.01); *G06F 11/1044* (2013.01); *G06F 12/0246* (2013.01); *G06F 2211/1059* (2013.01); *G06F 3/0688* (2013.01); *G06F 3/0616* (2013.01)
USPC ..................... 711/114; 711/103; 711/E12.103

(58) Field of Classification Search
None
See application file for complete search history.

(56) References Cited

U.S. PATENT DOCUMENTS

2007/0143561 A1* 6/2007 Gorobets ....................... 711/170
2010/0064111 A1* 3/2010 Kunimatsu et al. ........... 711/161
2011/0066882 A1* 3/2011 Walls et al. ................... 714/6.24

FOREIGN PATENT DOCUMENTS

WO 2007081638 A2 7/2007
WO 2010109674 A1 9/2010

OTHER PUBLICATIONS

International Search Report for International Application No. PCT/JP2011/001997 dated Aug. 30, 2011.

* cited by examiner

*Primary Examiner* — Edward Dudek, Jr
*Assistant Examiner* — Matthew Chrzanowski
(74) *Attorney, Agent, or Firm* — Volpe and Koenig, P.C.

(57) ABSTRACT

A storage system having multiple flash memory packages including flash memory chips and package controllers for controlling access to the flash memory chips is configured such that the package controller receives from a higher-level apparatus, which sends a write request, frequency prediction information that enables prediction of an update frequency with respect to data, which is to be a write target, and when writing data for which a write request has been issued from the higher-level apparatus, control is executed such that data, which is predicted to have a relatively high update frequency based on the frequency prediction information, is preferentially stored in a physical block with the large remaining number of erases in a flash memory chip of flash memory package of the package controller, or such that data, which is predicted to have a relatively low update frequency based on the frequency prediction information, is preferentially stored in a physical block with the small remaining number of erases in a flash memory chip of the flash memory package of the package controller.

14 Claims, 35 Drawing Sheets

RG#0 Address space

Address space of FMPKs comprising RG#0

| RG# | FMPK# | RAID level |
|---|---|---|
| 0 | 0,1,2,3 | RAID5 |
| 1 | 8,9,10,11,12,13,14,15 | RAID6 |
| 2 | Unallocated | — |
| : | | : |
| 5 | 17,18, 99,100 | RAID1+0 |
| : | : | : |

| LU# | RG# | Stripe block size | LU start address | LU size |
|---|---|---|---|---|
| 0 | 0 | 0x80 | 0x000000000 | 0x20000 |
| 1 | 0 | 0x100 | 0x100000000 | 0xC800000 |
| 2 | 5 | 0x80 | 0x000000000 | 0x100000000 |
| : | : | : | : | : |
| 5 | 2 | 0x200 | 0x200000000 | 0x8000 |
| : | : | : | : | : |

FMPK address space

| LU# | LU start address | Stripe block size | Parity stripe block start location | Parity stripe block cycle |
|---|---|---|---|---|
| 0 | 0x1000000 | 0x80 | 2 | 4 |
| 5 | 0x5000000 | 0x100 | 2 | 4 |

- Logical/physical page mapping management table — 134A
- FM block management table — 134B
- Number of blocks management table — 134C
- Reclamation threshold — 134D
- Number of reclamation migration blocks — 134E Memory

FIG. 27B  134A

| Logical page # | Physical page # |
|---|---|
| 0 | 99999 |
| 1 | 55 |
| 2 | Unallocated |
| : | : |
| 5 | 6350 |
| : | : |
| 8 | 12702 |
| : | : |

| Block type | Number of blocks |
|---|---|
| Unused | 10000 |
| Cold area write-in-progress | 50 |
| Normal area write-in-progress | 150 |
| Write-complete | 80000 |

| FM block # | Number of erases | Block utilization type | Block attribute | First write page | Number of valid pages |
|---|---|---|---|---|---|
| 0 | 100 | Write-complete | Cold | — | 0 |
| 1 | 0 | Write-in-progress | Normal | 10 | 100 |
| 2 | 900 | Unused (Young) | | — | 128 |
| 3 | 2500 | Unused (Old) | | — | 128 |
| 4 | 1200 | Unused (Middle) | | — | 128 |
| : | : | : | | : | : |

1343, 1344, 1345, 1346, 1347, 1348

STORAGE SYSTEM WITH MULTIPLE FLASH MEMORY PACKAGES AND DATA CONTROL METHOD THEREFOR

TECHNICAL FIELD

The present invention relates to a storage system that uses electrically rewritable flash memory as a storage medium and a data control technique therefor.

BACKGROUND ART

In line with the lower cost per bit of flash memory, flash memory has come to be used as a storage medium in storage systems in recent years. For configurational reasons, this flash memory can only guarantee data storage up to a limited number of erases. Therefore, in a storage system that utilizes flash memory, for example, steps are taken so as to extend the life of the storage system as long as possible by limiting the number of erases, limiting the write data size, and deleting data on a regular basis.

For example, technology, whereby a storage controller for controlling multiple flash memory packages carries out wear leveling (leveling) among flash memory packages in a storage system, which comprises multiple flash memory packages comprising flash memory chips, based on the frequency of updates with respect to the actual write throughput of data when a new flash memory package is added, is known (for example, refer to Patent Literature 1).

CITATION LIST

Patent Literature

PTL 1: WO 2010/109674

SUMMARY OF INVENTION

Technical Problem

For example, in the technology disclosed in Patent Literature 1, the problem is that the storage controller must measure the actual write throughput, putting a burden on the storage controller.

Alternatively, being able to control a data write to a flash memory package based on a data update frequency is effective for performing wear leveling in flash memory packages. However, it is not possible to discern an update frequency for write-target data at the point in time when a write request has been received in the flash memory package. Although the update frequency can be predicted in the flash memory package based on a write request received in the past, the problem is that this requires the carrying out of processing, such as measuring the number of writes in area units in the flash memory package and totalizing the number of writes within a unit of time, thereby increasing processing overhead.

With the foregoing in mind, an object of the present invention is to provide a technique that enables the life of a flash memory package to be extended appropriately while holding down on the processing overhead of the flash memory package.

Solution to Problem

To attain the above-mentioned object, a storage system related to one aspect of the present invention is a flash memory storage system, which has multiple flash memory packages comprising flash memory chips and package controllers for controlling access to data that utilizes memory areas of the flash memory chips, wherein, when the package controller receives from a higher-level apparatus, which sends a write request to the flash memory package, frequency prediction information that enables prediction of the update frequency with respect to the data that is to be the target of the write and is about to write the data with respect to the write request from the higher-level apparatus, exercises control so that data, which is predicted to have a relatively high update frequency based the frequency prediction information, is preferentially stored in a physical block with a large remaining number of erases in the flash memory chip of its own flash memory package, or so that data, which is predicted to have a relatively low update frequency based on the frequency prediction information, is preferentially stored in a physical block with a small remaining number of erases in the flash memory chip of its own flash memory package.

BRIEF DESCRIPTION OF DRAWINGS

FIG. 27A shows the memory 134 in the FM controller 131 of the FMPK 130. FIG. 27B shows an example of the configuration of the logical/physical page mapping management table. FIG. 27C shows an example of the configuration of the FM block management table. FIG. 27D shows an example of the configuration of the number of blocks management table.

DESCRIPTION OF EMBODIMENTS

Figure 1:
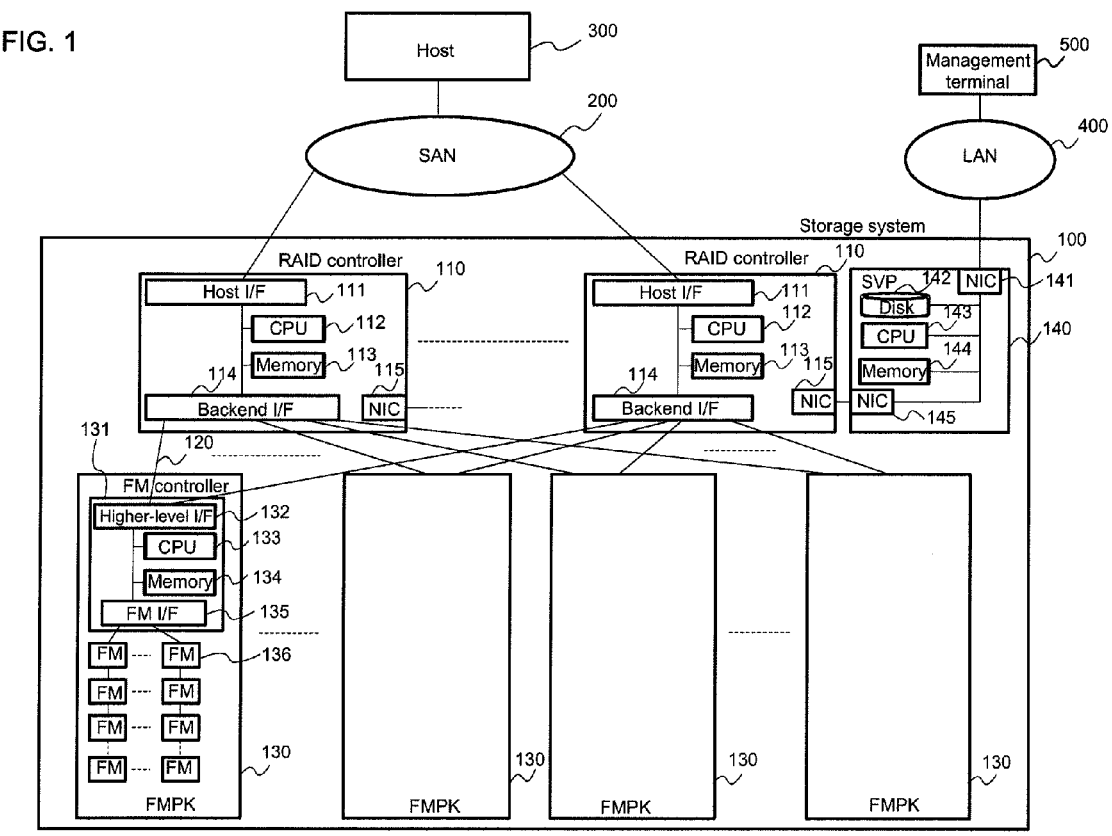
FIG. 1 is a block diagram of an entire information processing system related to a first embodiment of the present invention.

The embodiments of the present invention will be explained by referring to the drawings. Furthermore, the embodiments explained hereinbelow do not limit the invention to the claims, and not all of the elements or combinations thereof described in the embodiments are essential to the solution to the problem(s).

Furthermore, in the following explanation, various types of information may be explained using the expression "xxx table", but the various information may also be expressed using a data structure other than a table. To show that the various information is not dependent on the data structure, "xxx table" may be called "xxx information".

Furthermore, in the following explanation, a number will be used as the type of identification information for various targets (for example, a logical unit, a block, and a page), but other types of identification information may also be used.

Furthermore, in the following explanation, at least a portion of the processing carried out by the RAID controller and FM controller described hereinbelow will be performed in accordance with a processor (for example, a CPU (Central Processing Unit)) executing a computer program. The processor may be the CPU itself or may comprise a hardware circuit that carries out either all or part of the processing performed by the processor. A program may be installed in the respective controllers from a program source. The program source, for example, may be either a program delivery server or a storage medium.

First, an overview of the embodiment in the application concerned will be explained. In the embodiment in the application concerned, data is stored in the most appropriate physical block of a flash memory package and the life of the flash memory package is prolonged by operating the flash memory package and a higher-level apparatus, which either directly or indirectly sends an I/O request to the flash memory package, in concert. The higher-level apparatus, for example, may be a RAID (abbreviation for Redundant Array of Independent (or Inexpensive) Disks) controller or a host computer.

More specifically, the higher-level apparatus discerns frequency prediction information, which makes it possible to predict the update frequency related to data to be written to the flash memory package, and sends the frequency prediction information to the flash memory package. The frequency prediction information may be information, which directly shows that an update frequency is either high or low, or may be information that is used to predict an update frequency. In the meantime, the flash memory package determines the data update frequency based on the frequency prediction information received from the higher-level apparatus, and in accordance with the result of this determination decides on a physical block in which to store the data and stores the data. In accordance with this processing, the flash memory package is able to store the data in the most appropriate physical block without performing the process for measuring the actual I/O status with respect to the data, thereby making it possible to prolong the life of the flash memory package.

Next, a first embodiment of the present invention will be explained.

FIG. 1 is a block diagram of an entire information processing system related to the first embodiment of the present invention.

The information processing system comprises a storage system 100, a host computer (also called the host) 300, and a management terminal 500. There can be more than one storage system 100, host 300, and management terminal 500. The storage system 100 and the host 300, for example, are coupled together via a SAN (Storage Area Network) 200. In addition, the storage system 100 and the management terminal 500, for example, are coupled together via a LAN (Local Area Network) 400. The storage system 100 stores data that is used by the host 300. The host 300 executes various types of processing, and reads data from the storage system 100 and writes data to the storage system 100. The management terminal 500 comprises a display apparatus, and can display screens for managing the storage system 100 on this display apparatus. The management terminal 500 receives a management operation request from a user (for example, the operator of the management terminal 500), and sends the management operation request to the storage system 100. As management operation requests, for example, there are a RAID construction request and a LU construction request.

The storage system 100 comprises multiple RAID controllers 110, multiple flash memory packages (FMPK) 130, and a SVP (Service Processor) 140. Each RAID controller 110 is coupled to multiple FMPKs 130 via internal buses 120. Furthermore, the RAID controller 110 is an example of a higher-level apparatus with respect to the FMPK 130.

The RAID controller 110 comprises a host interface (host I/F) 111, a CPU 112, a memory 113, a backend interface (backend I/F) 114, and a NIC (Network Interface Card) 115. The host interface (host I/F) 111 mediates communications with the host 300. The host I/F 111, for example, may be a Fibre Channel (FC), an iSCSI, or the like. The CPU 112 executes various types of control processing in the RAID controller 110 by executing a program stored in the memory 113. The memory 113 stores a program and data required for control. This will be described in detail further below. The backend I/F 114 mediates communications with the FMPK 130. The backend I/F 114, for example, is a FC, a SAS, a SATA, or other such disk I/F. The NIC 115 mediates communications with the SVP 140.

The SVP 140 comprises a NIC 141, a disk 142, a CPU 143, a memory 144, and a NIC 145. The NIC 141 mediates communications with the management terminal 500 via the LAN 400. The disk 142 stores data and a program that are used to control the SVP 140, and data and a program that is installed in the RAID controller 110. The CPU 143 controls the operation of the SVP 140. For example, the CPU 143 sends various requests to the RAID controller 110 via the NIC 145 based on management operation requests received via the NIC 141. Specifically, the CPU 143, upon receiving a RAID construction request, sends an RG creation request comprising RAID configuration information ("RG # (RAID group number)", "RAID level", "FMPK", and so forth), and upon receiving a LU (Logical Unit) construction request, sends a LU creation request comprising LU configuration information ("RG #", "LU # (LU number)", "LU size", "stripe block size", and so forth). The memory 144 stores the management data and program(s) required for control. The NIC 145 is coupled to multiple RAID controllers 110 and mediates communications with the RAID controllers 110.

The FMPK 130 comprises multiple flash memory chips (called FM) 136, and a flash memory controller (FM controller) 131 as an example of a package controller for controlling access to the FM 136. The FM controller 131 comprises a higher-level interface (higher-level I/F) 132, a CPU 133, a memory 134, and a flash memory interface (FM I/F) 135. The higher-level I/F 132 mediates communications with the higher-level apparatus. The CPU 133 controls the operation of the FM controller 131. The specific processing will be explained further below. The memory 134 stores the data and program(s) required for control. These will be explained in detail further below. The FM I/F 135 mediates communications with the FM 136. The FM 136, for example, is a NAND-type flash memory chip, but may also be another type of flash memory chip.

Figure 2:
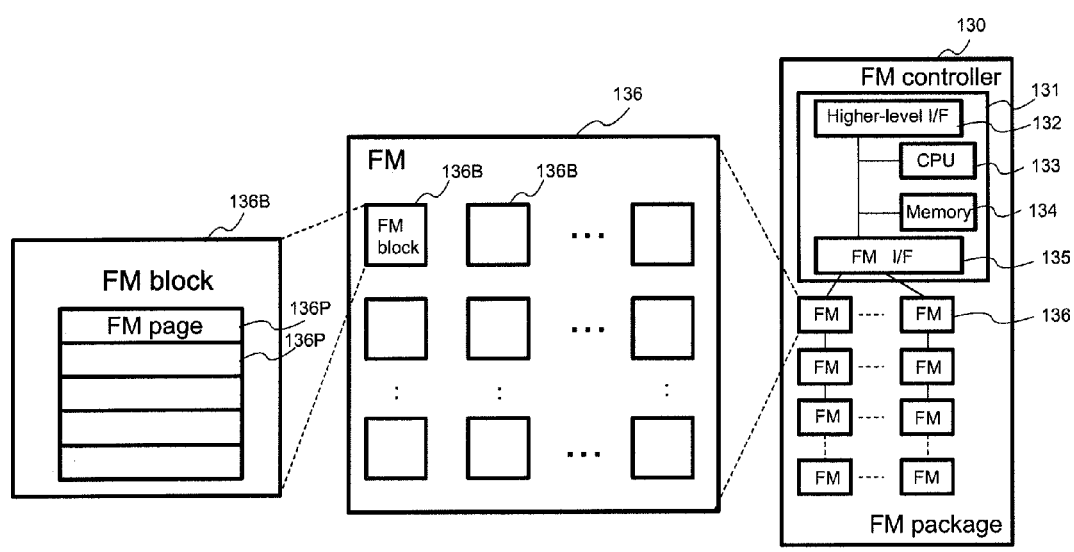
FIG. 2 is a diagram illustrating the configuration of a flash memory package related to the first embodiment of the present invention.

FIG. 2 is a diagram illustrating the configuration of a flash memory package related to the first embodiment of the present invention. The FM 136 is configured from multiple physical blocks 136B. Each physical block 136B is configured from multiple physical pages 136P.

The FM 136 is a NAND-type FM chip and comprises the following characteristic features.

(1) For the FM 136, the read/write unit is the page, and the erase unit is the block, which is configured from multiple pages. At the time of a write, write-target data is written to either one or multiple physical pages. Also, at the time of a read, read-target data, which has been written to either one or multiple physical pages, is read. Furthermore, the write- (or read-) target data is not limited to being written to the entire one (or multiple) physical page(s). The write- (or read-) target data may be written to a portion of the one (or multiple) physical page(s).

(2) The FM 136 is a write once, read many-type storage medium. That is, a physical page in the FM 136 cannot be overwritten. For this reason, when data is to be updated, the write-target data is written to a free page, and the page in which the pre-update data was stored becomes an invalid page. Therefore, a reclamation process is needed to reuse a block for which a write has been completed. The reclamation process basically comprises a process for saving valid data that is being stored in a reuse-target block in another block, and a process for erasing (Erase) the reuse-target block data.

(3) In the FM 136, the number of times a block can be erased is limited.

Figure 3:
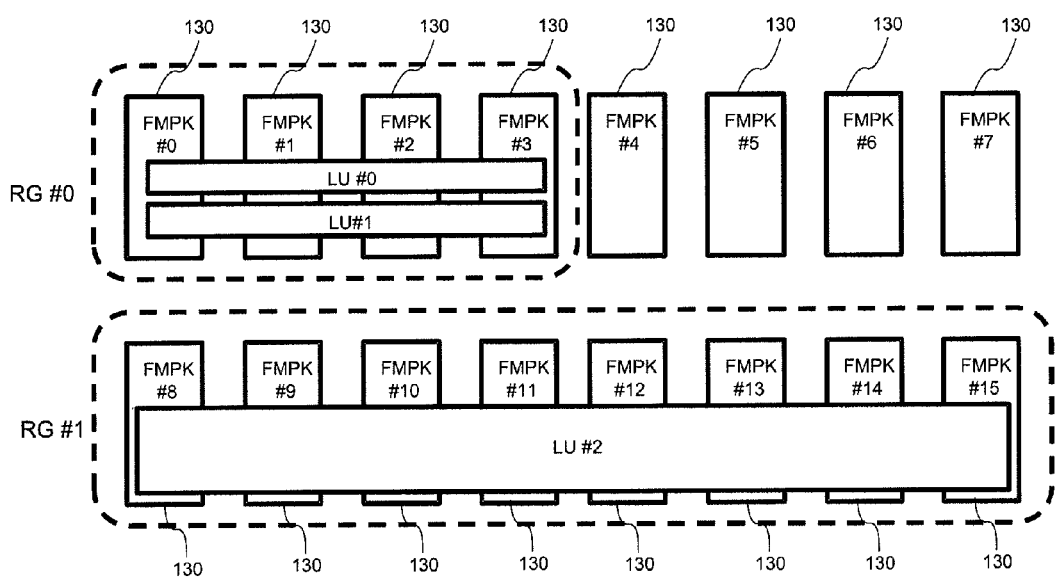
FIG. 3 is a diagram illustrating a RAID group in a storage system related to the first embodiment of the present invention.

FIG. 3 is a diagram illustrating a RAID group in a storage system related to the first embodiment of the present invention. Here the FMPK 130 number expresses the $n^{th}$ (where n is an integer) FMPK 130 as "FMPK #n", the RG number expresses the $n^{th}$ (where n is an integer) RG as "RG #n", and the LU number expresses the $n^{th}$ (where n is an integer) LU as "LU #n".

In this embodiment, a RAID group (RG) is configured from two or more FMPKs 130 from among the multiple FMPKs 130 and is managed by the RAID controller 110. For example, RG #0 is configured from the four FMPKs 130 of FMPK #0 through FMPK #3, and RG #1 is configured from the eight FMPKs 130 of FMPK #8 through FMPK #15.

The RAID controller 110 is able to form multiple (or one) LUs by logically partitioning the storage space provided by the RAID group. At least one of the multiple LUs configured from the storage space is provided to the host 300 as the higher-level apparatus of the storage system 100. In this drawing, for example, LU #0 and LU #1 are formed in the RG #0 storage space.

Figure 4A:
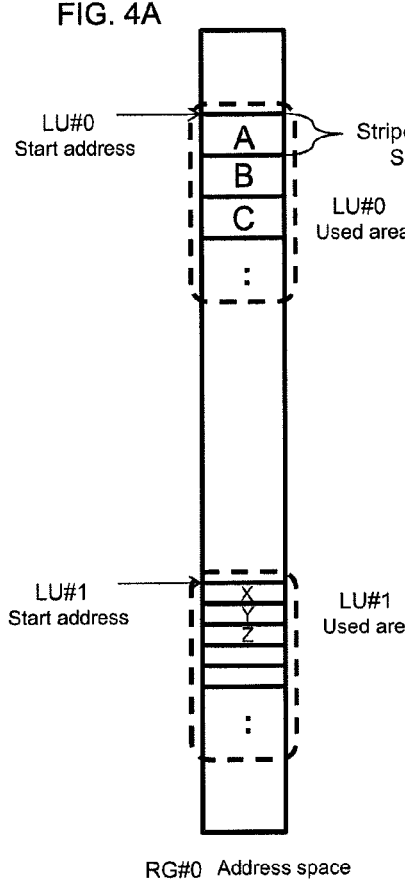
FIG. 4A shows an example of an RG address space.
Figure 4B:
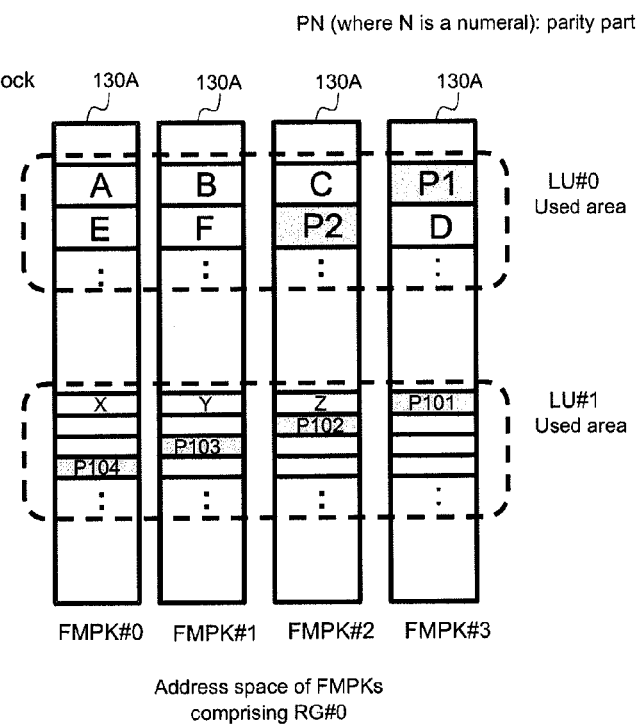
FIG. 4B shows FMPK address spaces comprising the corresponding RG.

FIG. 4 is a diagram illustrating the relationship between the arrangement of LUs inside a RAID group and a FMPK address space. FIG. 4A shows an example of an RG address space, and FIG. 4B shows FMPK address spaces comprising the corresponding RG.

As shown in FIG. 4A, for example, multiple LUs (LU #0, LU #1) comprise the RG #0. LU #0 and LU #1 are partitioned and managed in areas of prescribed size blocks (stripe blocks). Furthermore, this drawing shows an example in which the stripe block size of LU #0 and LU #1 differ.

RG #0, for example, is a RAID 5. In this embodiment, the RAID controller 110 computes one parity data from the multiple stripe blocks (three in this example) in the LU, and as shown in FIG. 4B, write control is carried out such that the FMPKs in which the respective stripe block data is stored will differ from the FMPK in which the parity data is stored. Specifically, in LU #0 of RG #0, parity data P1 is computed from the stripe blocks A, B and C and this parity data P1 and these stripe blocks A, B, and C are distributed and stored in address spaces 130A of respectively different FMPKs 130, and parity data P2 is computed from the stripe blocks D, E and F and this parity data P2 and these stripe blocks D, E, and F are distributed and stored in the address spaces 130A of respectively different FMPKs 130.

The update frequencies of the areas (data parts) in which the stripe block data are stored and the areas (parity parts) in which the parity data are stored in the address spaces 130A of the FMPK 130 will be considered here.

In a RAID 5 and RAID 6 RG, parity data such as that mentioned above is computed based on multiple stripe blocks. Since the parity data is computed in accordance with multiple stripe blocks like this, when the data inside any of the stripe blocks that serve as the basis for the computation is updated, the parity data is computed once again and updated. Therefore, for example, in a case where it is supposed that writes will be carried out equally in all areas inside the LU, three times as many writes will be performed in the parity part as in the data part. Even when writes are not carried out equally in all areas inside the LU, the frequency of updates in the parity part can be expected to be several times that of the data parts. Consequently, the parity part can be called a high update frequency area, and the data part can be called a low update frequency area.

Figure 5:
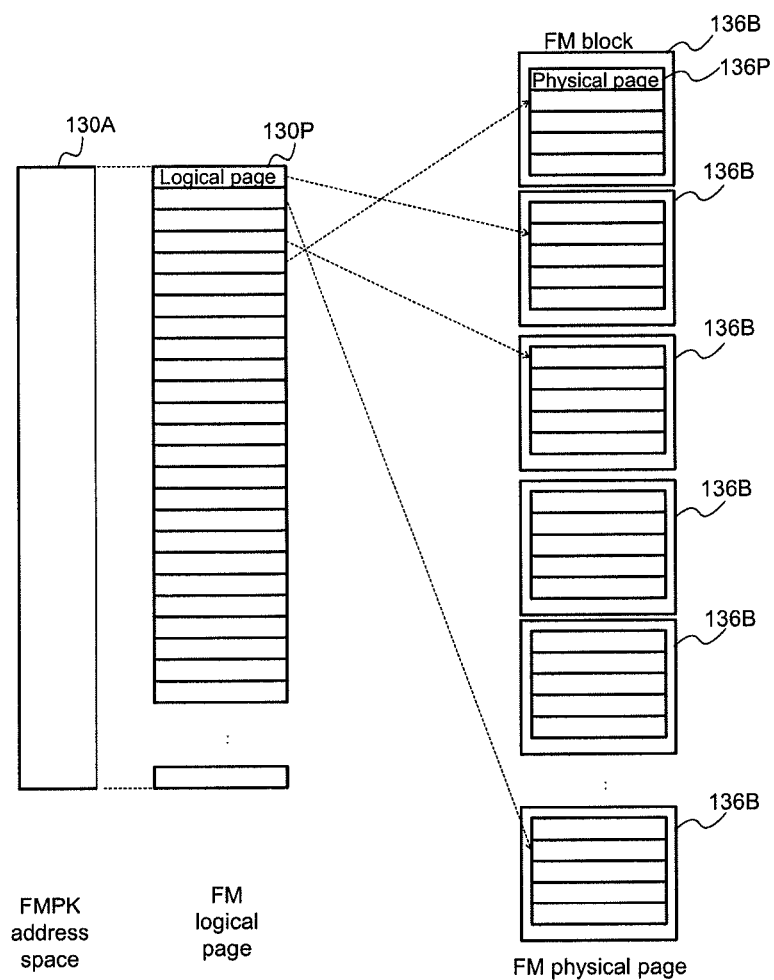
FIG. 5 is a diagram showing the relationship between a FMPK address space and a FM physical page.

FIG. 5 is a diagram showing the relationship between the FMPK address space and a FM physical page.

The FMPK 130 address space 130A is partitioned and managed in logical pages 130P of a prescribed size. A physical page 136P inside any FM block 136B of the FM 136 is mapped to a logical page 130P. Furthermore, mapping management between the logical page 130P and the physical page 136P is carried out in accordance with the FM controller 131 using a logical/physical page mapping table 134A, which will be described further below. Furthermore, the mapping management method is not limited to using a table. Any of a variety of methods can be used, the point being that the location of a physical page can be uniquely identified when a FMPK address has been specified.

Figures 6A, 6B, 6C:
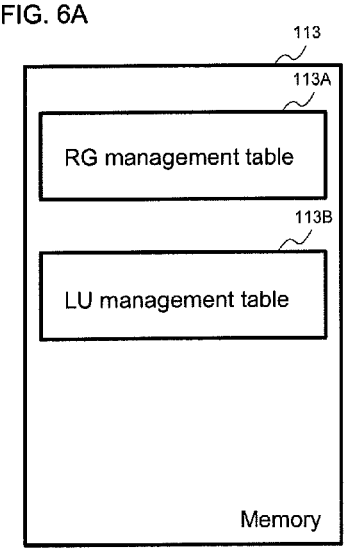
FIG. 6A shows the memory 113 inside the RAID controller 110.
FIG. 6B shows an example of the configuration of a RG management table.
FIG. 6C shows an example of the configuration of a LU management table.

FIG. 6 is a diagram illustrating the memory inside the RAID controller related to the first embodiment, and the tables stored in the memory. FIG. 6A shows the memory 113 inside the RAID controller 110, FIG. 6B shows an example of the configuration of a RG management table, and FIG. 6C shows an example of the configuration of a LU management table.

As shown in FIG. 6A, the memory 113 inside the RAID controller 110 stores a RG management table 113A for managing RG configuration information, and a LU management table 113B for managing LU configuration information. The RG management table 113A, as shown in FIG. 6B, manages a record, which corresponds to a RG number (RG #) 1131, a FMPK number (FMPK #) 1132, and a RAID level 1133. The RG #1131 is a number for uniquely identifying a RG in the storage system 100. The FMPK #1132 is the number of a FMPK comprising the corresponding RG. The RAID level 1133 is the RAID level of the corresponding RG. In this drawing, for example, RG #0 is configured from FMPKs 0, 1, 2, and 3, and is RAID 5.

The LU management table 113B, as shown in FIG. 6C, manages a record corresponding to a LU number (LU #) 1134, a RG #1135, a stripe block size 1136, a LU start address 1137, and a LU size 1138. The LU #1134 is a number for uniquely identifying a LU in the storage system 100. The RG #1135 is the number of a RG for which the corresponding LU has been defined. The stripe block size 1136 is the size of the stripe block in the corresponding LU. The LU start address 1137 is the address in the RG at which the corresponding LU starts. The LU size 1138 is the size of the corresponding LU.

Figures 7A, 7B, 7C, 7D:
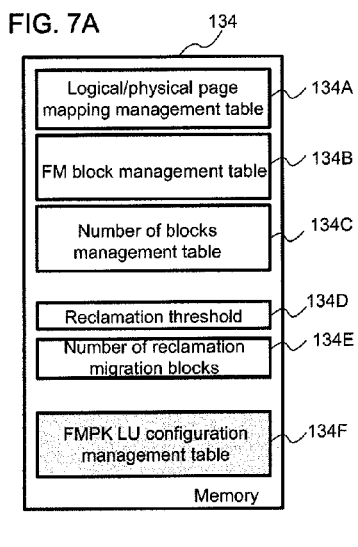
FIG. 7A shows the memory 134 inside the FM controller 131 of the FMPK 130.
FIG. 7B shows an example of the configuration of a logical/physical page mapping management table.
FIG. 7C shows an example of the configuration of a FM block management table.
FIG. 7D shows an example of the configuration of a number of blocks management table.

FIG. 7 is a diagram illustrating the memory inside the FMPK related to the first embodiment, and the tables stored in the memory. FIG. 7A shows the memory 134 inside the FM controller 131 of the FMPK 130, FIG. 7B shows an example of the configuration of a logical/physical page mapping management table, FIG. 7C shows an example of the configuration of a FM block management table, and FIG. 7D shows an example of the configuration of a number of blocks management table.

The memory 134 inside the FM controller 131 of the FMPK 130 stores a logical/physical page mapping management table 134A, which manages the corresponding relationship between a logical page and a physical page inside the FMPK 130, a FM block management table 134B for managing information of a block (physical block) of the FM 136 inside the FMPK 130, a number of blocks management table 134C for managing the number of blocks inside the FMPK 130 for each type of utilization, a reclamation threshold 134D, a number of reclamation migration blocks 134E, and a FMPK LU configuration management table 134F for managing information related to the configuration of the LU defined by the higher-level apparatus in the FMPK.

The reclamation threshold 134D is a threshold, which constitutes the condition by which the FM controller 131 starts the execution of the reclamation process. The threshold, for example, can be either a threshold for the number of write-complete blocks, which is a block in which data has been written to all the pages, or a threshold for the percentage (for example, %) of the number of write-complete blocks with respect to the total number of blocks inside the FMPK 130. For example, in a case where the threshold for the number of write-complete blocks is set, the FM controller 131 starts the reclamation process when the number of write-complete blocks exceeds the threshold, and in a case where the threshold for the percentage of the number of write-complete blocks with respect to the total number of blocks has been set, the FM controller 131 starts the reclamation process when the percentage of the number of write-complete blocks with respect to the total number of blocks exceeds the threshold.

The number of reclamation migration blocks 134E is the number of blocks for which an erase operation is performed in a single reclamation process, that is, the number of blocks that are converted to the unused state.

The logical/physical page mapping management table 134A, as shown in FIG. 7B, correspondingly stores a logical page number (logical page #) 1341 and a physical page number (physical page #) 1342. The logical page #1341 is the number of a logical page in the FMPK 130. The physical page #1342 is the number of the physical page 136P in which the data of the logical page 130P of the corresponding logical page # is stored. Furthermore, in this embodiment, information denoting unallocated is stored in the physical page # column with respect to a logical page to which a physical page has not been allocated. This drawing, for example, shows that the physical page 136P of physical page #6350 has been allocated to the logical page 130P of logical page #5.

The FM block management table 134B, as shown in FIG. 7C, correspondingly stores a FM block number (FM block #) 1343, a number of erases 1344, a block utilization type 1345, a block attribute 1346, a first write page 1347, and a number of valid pages 1348.

The FM block #1343 is the number of a FM block 136B in the FMPK 130. The number of erases 1344 is the cumulative number of erases that have been carried out with respect to the corresponding FM block 136B. The block utilization type 1345 is the type (type of utilization) corresponding to the block utilization status. In this embodiment, the types of utilization in this table can include write-complete, which is a state in which a write has been carried out to all the pages in the FM block 136B, write-in-progress, which is a state in which a page to which data has been written and a page (free page) to which data has not been written are intermixed in the FM block 136B, unused, which is a state in which no data at all has been written to a page in the FM block 136B, that is, a state in which the FM block 136B is configured entirely of free pages. In this embodiment, the utilization type unused includes unused (Young), unused (Middle), and unused (Old), and is classified as any of these in accordance with the number of erases of the corresponding FM block 136B. In this embodiment, a FM block 136B is classified in order from the smallest number of erases remaining as unused (Old), unused (Middle), and unused (Young). In this embodiment, for example, an unused FM block 136B with a number of erases from 0 through 999 is classified as unused (Young), an unused FM block 136B with a number of erases from 1000 through 1999 is classified as unused (Middle), and an unused FM block 136B with a number of erases from 2000 through 2999 is classified as unused (Old). Furthermore, the number of erases, which is the criteria when classifying an unused FM block 136B, need not be fixed, but rather may change in a relative manner on the basis of the number of erases of all the FM blocks 136B of the FMPK.

The block attribute 1346 is block attribute information that is determined by the update frequency of the data stored in the corresponding FM block 136B. In this embodiment, the block attribute information is set as Hot in a case where the update frequency of the data to be written is predicted to be high, and is set as Normal in a case where the update frequency is predicted to be lower than that. In this embodiment, the FM controller 131 regards the update frequency as high in a case where the data written to the FM block 136B is RAID parity data, and sets the block attribute to Hot, and in a case other than this, sets the block attribute to Normal.

The first write page 1347 denotes the first free page in the corresponding FM block 136B. In this embodiment, the first write page 1347 is only valid in a case where the corresponding block utilization type is write-in-progress. The number of valid pages 1348 is the number of pages in the corresponding FM block 136B in which valid data is stored.

The number of blocks management table 134C, as shown in FIG. 7D, correspondingly stores a block type 1349 and a number of blocks 1350. The block type 1349 is the block utilization type. In this table, the types of utilization include unused, which is a state in which no data at all has been written to the pages of the FM block 136B, that is, the FM block 136B is configured entirely of free pages; write-complete, which is a state in which a write has been carried out to all the pages in the FM block 136B; Hot area write-in-progress, which is a state in which a page, to which data with a predicted high update frequency has been written, and a free page are intermixed in the FM block 136B; Normal area write-in-progress, which is a state in which a page, to which data with a predicted Normal update frequency has been written, and a free page are intermixed in the FM block 136B. The number of blocks 1350 stores the total number of FM blocks 136B of the corresponding utilization type in the FMPK 130. For example, in this drawing, it is clear that the number of unused blocks is 10,000, the number of Hot area write-in-progress blocks is 50, the number of Normal area write-in-progress blocks is 150, and the number of write-complete blocks is 80,000.

Figures 8A, 8B:
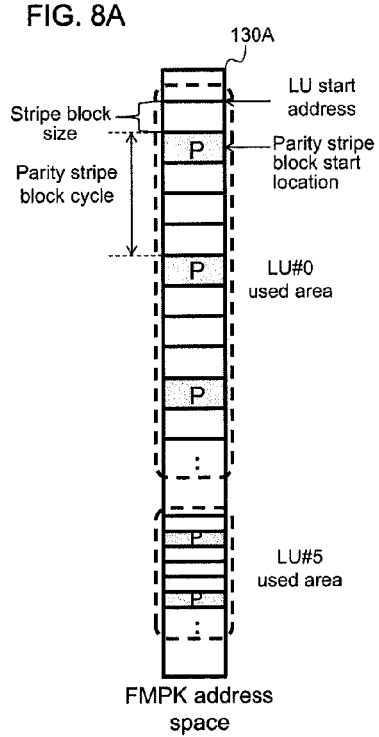
FIG. 8A shows a FMPK address space.
FIG. 8B shows a FMPK LU configuration management table.

FIG. 8 is a diagram illustrating a FMPK address space and a FMPK LU configuration management table. FIG. 8A shows a FMPK address space, and FIG. 8B shows a FMPK LU configuration management table.

The FMPK LU configuration management table 134F, as shown in FIG. 8B, correspondingly manages a LU #1351, a LU start address 1352, a stripe block size 1353, a parity stripe block start location 1354, and a parity stripe block cycle 1355.

The LU #1351 is the LU number that is defined in the FMPK 130. The LU start address 1352 is the start address (refer to FIG. 8A: the LU start address) in the address space 130A of the FMPK 130 with respect to the corresponding LU. The stripe block size 1353 is the size of the stripe block in the corresponding LU (refer to FIG. 8A). The parity stripe block start location 1354 is the location where the stripe block (parity stripe block), which stores the parity data, first appears counting from the beginning of the corresponding LU. For example, in the LU #0 shown in FIG. 8A, this location is 2. The cycle 1355 is the number of stripe blocks in the corresponding LU from the parity stripe block until the next parity stripe block. For example, in the LU #0 shown in FIG. 8A, this cycle is 4.

In this embodiment, each piece of information stored in the FMPK LU configuration management table 134F is sent from the RAID controller 110, which is the higher-level apparatus, to the FM controller 131. Since the location of the parity stripe in the LU is clear from the information stored in this FMPK LU configuration management table 134F, the FM controller 131 is able to identify whether or not the data for which there was a write request from the RAID controller 110 is parity stripe data. The processing of the FM controller 131 will be described further below.

Next, the operation of the information processing system in this embodiment will be explained.

Figure 9:
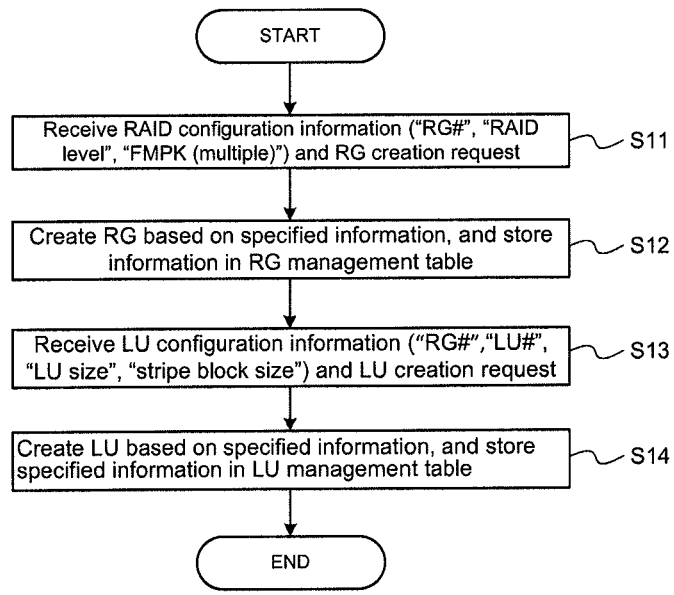
FIG. 9 is a flowchart of LU/RG creation processes.

FIG. 9 is a flowchart of a LU/RG creation process. The LU/RG creation process is executed by the RAID controller 110 when creating a LU and RG.

The RAID controller 110 receives from the SVP 140 a request to create a RG (RG creation request) and RG configuration information with respect to the RG that is to be created (S11). The RG configuration information here, for example, comprises the number of the RG to be created ("RG #"), the RAID level of the RG to be created ("RAID level"), and the numbers of the multiple FMPKs ("FMPK #") that will comprise the RG to be created.

Next, the RAID controller 110 creates the RG based on the specified RG configuration information, and stores the information of the created RG in the RG management table 113A (S12).

Next, the RAID controller 110 receives from the SVP 140 a request to create a LU (LU creation request) and LU configuration information with respect to the LU to be created (S13). The LU configuration information here, for example, comprises the number of the RG that will create the LU ("RG #"), the number of the LU to be created ("LU #"), the size of the LU to be created ("LU size"), and the size of the stripe block in the LU to be created ("stripe block size").

Next, the RAID controller 110 creates the LU based on the specified LU configuration information, and stores the information of the created LU in the LU management table 113B (S14). In accordance with this, it becomes possible for the RAID controller 110 to control the I/O with respect to the created LU.

Next, the process when the RAID controller 110 writes to the LU (LU write process) will be explained.

Figure 10:
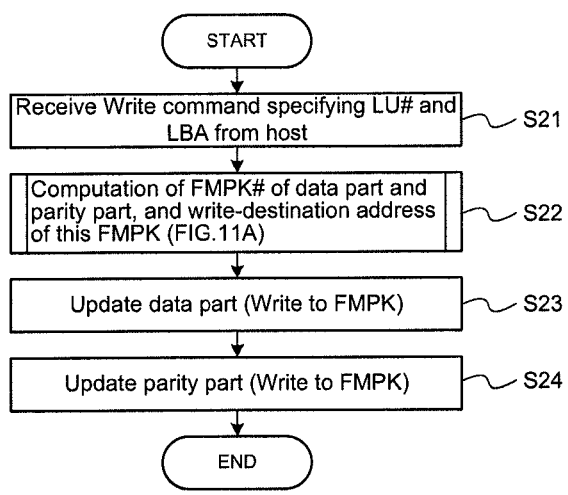
FIG. 10 is a flowchart of a LU write process.

FIG. 10 is a flowchart of the LU write process.

The RAID controller 110, upon receiving via the host 300 and SAN 200 a write request (Write command) specifying a LU #, where write-target data is stored, and a LBA (Logical Block Address), which is the storage-destination address (write-destination LBA) (S21), executes a write-destination FMPK computation process (FIG. 11A) for computing a write-destination address and a FMPK # of the storage destination of the write-target data part, and a write-destination address and a FMPK # of the storage destination of the parity part, which is the parity data with respect to the write-target data part (S22).

Next, the RAID controller 110 uses the computed FKPK # and write-destination address to write the data part to the FMPK 130 (S23), and uses the computed FKPK # and write-destination address to write the parity part to the FMPK 130 (S24).

Figure 11A:
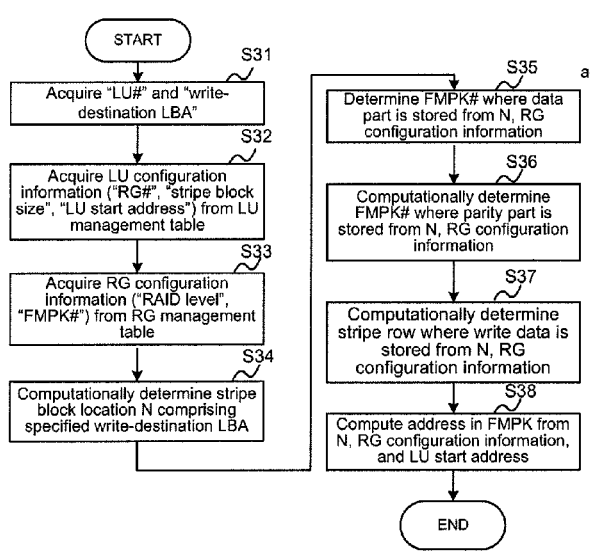
FIG. 11A is the flowchart of the write-destination FMPK computation process.
Figure 11B:
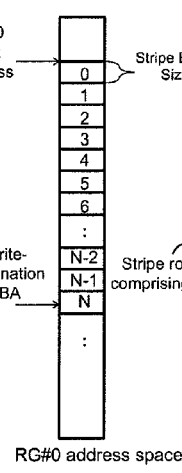
FIG. 11B is a diagram showing an example of an RG address space.
Figure 11C:
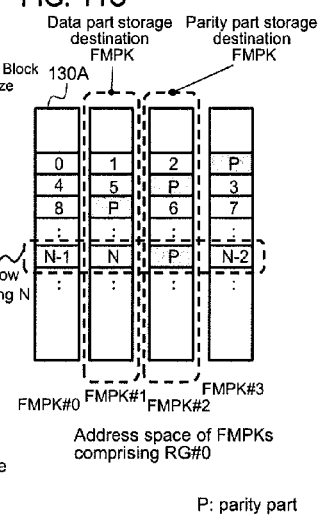
FIG. 11C is a diagram showing examples of FMPK address spaces.

FIG. 11 is a diagram illustrating a flowchart of the write-destination FMPK computation process and the FMPK computation. FIG. 11A is the flowchart of the write-destination FMPK computation process, FIG. 11B is a diagram showing an example of an RG address space, and FIG. 11C is a diagram showing examples of FMPK address spaces.

The RAID controller 110 acquires the "LU #" and the "write-destination LBA" from the write command received from the host 300 (S31), and acquires the LU configuration information ("RG #", "stripe block size", "LU start address") of the LU corresponding to the acquired "LU #" from the LU management table 113B (S32). In addition, the RAID controller 110 acquires the RG configuration information ("RAID level", "FMPK #") of the RG corresponding to the acquired "RG #" from the RG management table 113A (S33).

Next, the RAID controller 110 uses the stripe block size to compute the location N of the stripe block comprising the write-destination LBA (S34). As shown in FIG. 11B, this makes it possible to identify the location of the stripe block, which constitutes the write destination inside the LU.

Next, the RAID controller 110, based on the computed location N, the RAID level, and multiple FMPK #s, determines the FMPK # where the stripe block of location N, which corresponds to the data part, is stored (S35). For example, in a case where the RAID level is RAID 5 and four FMPKs comprise the RG, as shown in FIG. 11C, it is possible to identify the FMPK in which the stripe block of location N corresponding to the data part is stored.

Next, the RAID controller 110, based on the computed location N, the RAID level, and multiple FMPK #s, determines the FMPK # where the parity part corresponding to the stripe block of location N, which corresponds to the data part, is stored (S36). For example, in a case where the RAID level is RAID 5 and four FMPKs comprise the RG, as shown in FIG. 11C, it is possible to identify the FMPK in which the parity part is stored.

Next, the RAID controller 110, based on the computed location N, the RAID level, and multiple FMPK #s, determines the stripe row, where the data part and the parity part corresponding thereto are stored (S37). For example, in a case where the RAID level is RAID 5 and four FMPKs comprise the RG, as shown in FIG. 11C, it is possible to identify the stripe row. Next, the RAID controller 110 uses the identified stripe row and the LU start address to compute the addresses of the FMPKs 130, where the data part and parity part are stored (write-destination address) (S38). This makes it possible to compute write-destination address and the FMPK #, which will store the data part, and the write-destination address and the FMPK #, which will store the parity part.

Figure 12:
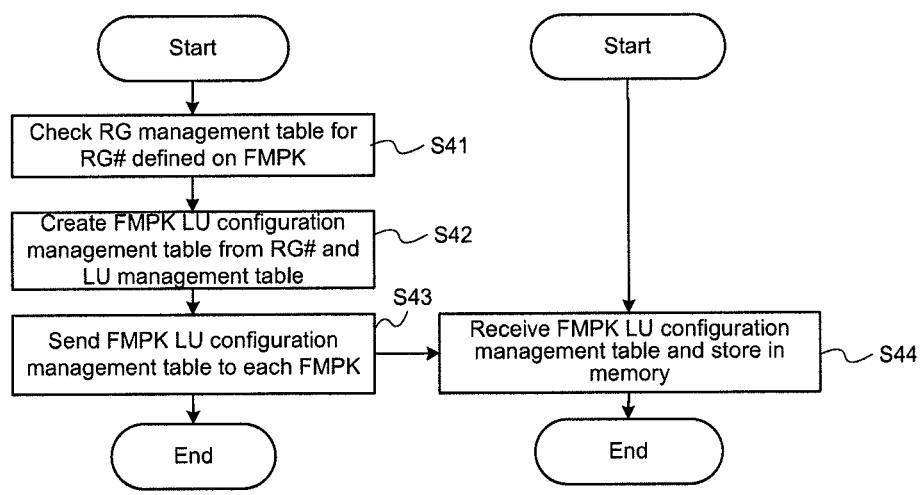
FIG. 12 is flowcharts of LU configuration management table send and receive processes.

FIG. 12 is a flowchart of a LU configuration management table send and receive process. This LU configuration management table send and receive process, for example, is executed after the LU has been configured and before the LU write process shown in FIG. 10 is executed.

First, the RAID controller 110 checks the RG management table 113A for the RAID level and the RG # defined for each FMPK 130 (S41), and creates a FMPK LU configuration information table as shown in FIG. 8B based on the RG #s and LU management table 113B (S42). Specifically, the RAID controller 110 uses the RG # to acquire the LU #, the stripe block size, and the LU start address from the LU management table 113B, and based on the RAID level and number of FMPKs comprising the RG, computes the parity stripe block start location and the parity stripe block cycle and stores the computed information in the FMPK LU configuration information table. Next, the RAID controller 110 sends each piece of configuration information (an example of frequency prediction information) of the created FMPK LU configuration information table to each FMPK 130 (S43). Meanwhile, the FM controller 131 stores each piece of configuration information (an example of frequency prediction information) of the FMPK LU configuration information table sent from the RAID controller 110 in the memory 134 as the FMPK LU configuration information table 134F (S44). According to the processing described above, frequency prediction information can be created relatively easily and sent to the FM controller 131 without measuring and totalizing the actual update frequency in the RAID controller 110.

Figure 13:
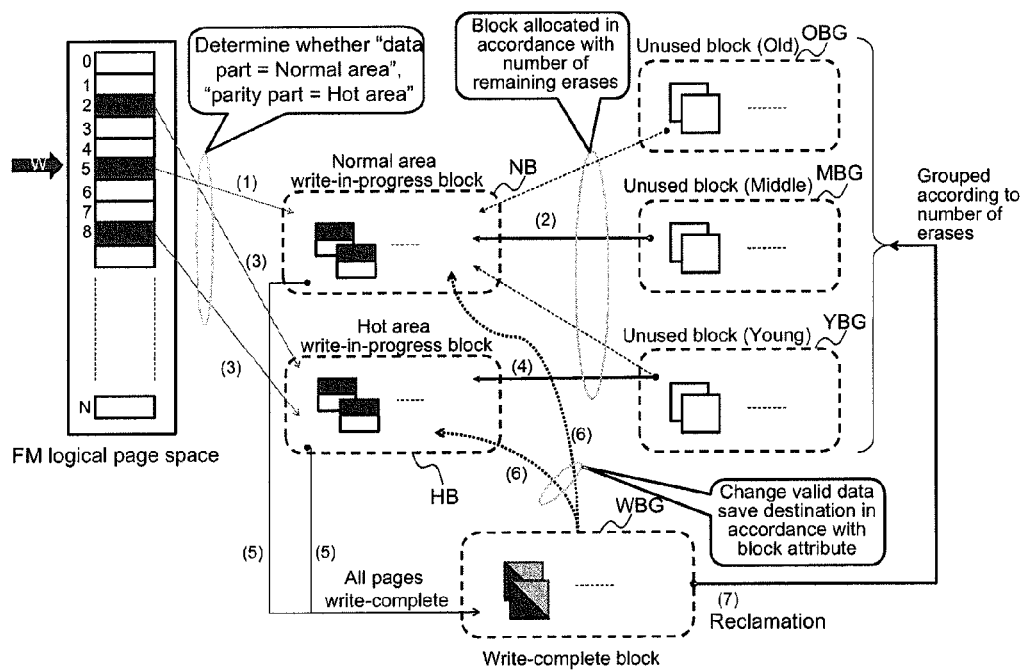
FIG. 13 is a diagram illustrating an overview of processing in a FMPK related to the first embodiment of the present invention.

FIG. 13 is a diagram illustrating an overview of processing in the FMPK related to the first embodiment of the present invention.

In the FMPK 130, upon receiving a write request from the RAID controller 110, the FM controller 131 determines based on the information of the FMPK LU configuration information table 134B whether the relevant write request data is a data part, whose update frequency is predicted to be normal, or a parity part, whose update frequency is predicted to be relatively high. Then, in a case where it is determined to be a data part, whose update frequency is predicted to be normal, the FM controller 131 stores the data in the Normal area write-in-progress block NB ((1) in the drawing). In a case where Normal area write-in-progress block NB does not exist here, the FM controller 131 selects an unused block from the unused block (Middle) group MBG and allocates this unused block as the data write destination ((2) in the drawing).

Alternatively, in a case where the determination is that the relevant write request data is the parity part, whose update frequency is predicted to be relatively high, the FM controller 131 stores the data in the Hot area write-in-progress block HB ((3) in the drawing). In a case where Hot area write-in-progress block HB does not exist here, the FM controller 131 selects an unused block from the unused block (Young) group YBG, which is the group of block with the most remaining number of erases, and allocates this unused block as the data write destination ((4) in the drawing). This makes it possible to consolidate the parity parts whose update frequencies are predicted to be relatively high in the same block. Consolidating the parity parts whose update frequencies are predicted to be relatively high in the same block like this enables a write to all pages inside a block to be completed relatively quickly, and in the case of a write-complete state, increases the likelihood of all the pages becoming invalid relatively quickly. Therefore, in the reclamation process, which will be described further below, there is no need to carry out a process for saving valid pages remaining inside the block to another block, making it possible to reduce the wasteful utilization of a page by the same data being written to another block once again.

In a case where a write to all the pages inside a block has been completed by writing data to either a Normal area write-in-progress block NB or a Hot area write-in-progress block HB, the FM controller 131 classifies this block in the write-complete block group WBG ((5) in the drawing).

Also, in a case where the reclamation process has started, the FM controller 131 selects a block in which there are either no or few valid pages from the blocks of the write-complete block group WBG, and in a case where there is a valid page, saves the relevant valid page to a write-in-progress block having the same block attribute as the block attribute of the relevant block ((6) in the drawing). For example, in the case where the block attribute is Hot, the FM controller 131 saves the data to the Hot area write-in-progress block HB, whose block attribute is Hot, and in a case where the block attribute is Normal, saves the data to the Normal area write-in-progress block NB, whose block attribute is Normal. This makes it possible to consolidate data having the same update frequency in the same block.

Next, the FM controller 131, subsequent to all the pages inside a block becoming invalid pages, erases all the data of the relevant block, changes the relevant block to an unused block, and groups the block based on number of erases ((7) in the drawing). This makes it possible to appropriately classify the respective blocks into multiple block groups in accordance with the remaining number of erases.

Next, the processing shown in FIG. 13 will be explained in detail.

Figure 14A:
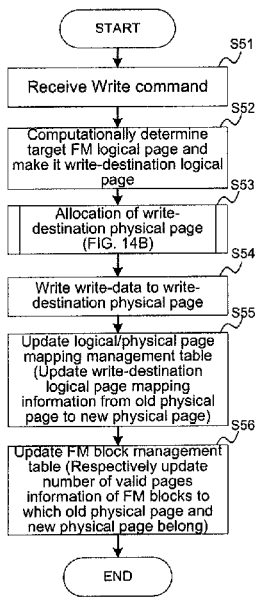
FIG. 14A is the flowchart of the write process.
Figure 14B:
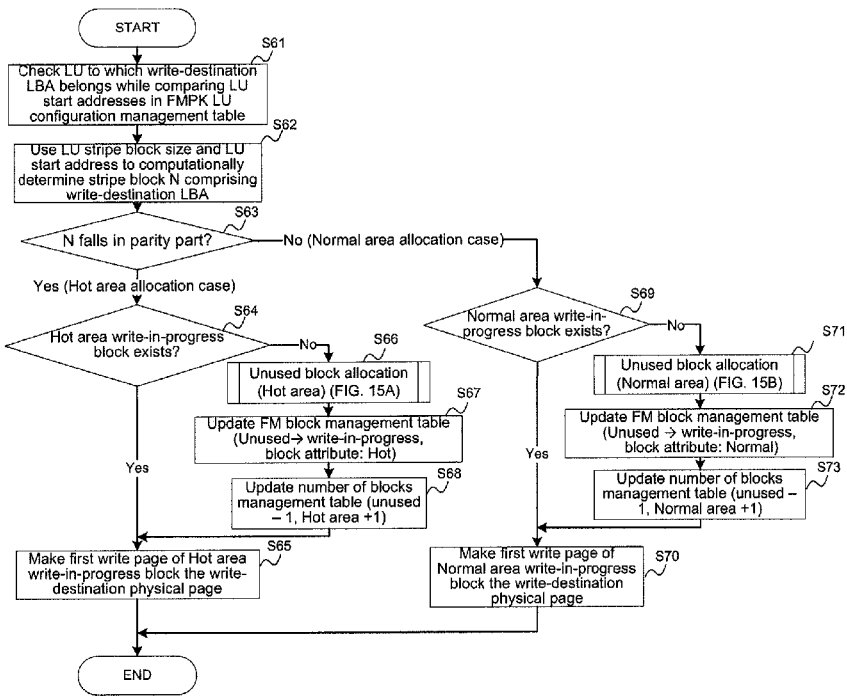
FIG. 14B is the flowchart of the write-destination physical page allocation process.

FIG. 14 is flowcharts of write processing in the FMPK and a write-destination physical page allocation process. FIG. 14A is the flowchart of the write process, and FIG. 14B is the flowchart of the write-destination physical page allocation process.

In the write process, the FM controller 131, upon receiving a write command from the RAID controller 110 (S51), computationally determines the FM logical page that will become the write target of the write command, and regards the relevant FM logical page as the write-destination logical page (S52). Furthermore, for example, the address in the FMPK address space to which the data is to be written (for example, the LBA) is stored in the write command.

Next, the FM controller 131 executes the write-destination physical page allocation process (FIG. 14B) to allocate a write-destination physical page for allocation to the write-destination logical page (S53).

Next, the FM controller 131 writes the write data corresponding to the write command to the allocated write-destination physical page (S54), and updates the logical/physical page mapping management table 134A (S55). That is, the FM controller 131 correspondingly stores the number of the write-destination physical page (physical page #) that was allocated with respect to the number of the write-destination logical page (logical page #) in the logical/physical page mapping management table 134A.

Next, the FM controller 131 updates the FM block management table 134B (S56). Specifically, the FM controller 131 changes in the FM block management table 134B that information, which should be changed in accordance with writing the data, from among the information associated with the FM block comprising the write-destination physical page.

As shown in FIG. 14B, in the write-destination physical page allocation process, the FM controller 131 checks and identifies the LU to which the write-destination LBA included in the write command belongs by comparing the LU start addresses in the FMPK LU configuration information table 134B (S61).

Next, the FM controller 131 uses the LU start address and stripe block size associated with the LU identified in the FMPK LU configuration information table 134B to determine by computation the stripe block N comprising the write-destination LBA (S62). Next, the FM controller 131 uses the parity stripe block start location and the parity stripe block cycle associated with the LU identified in the FMPK LU configuration information table 134B to determine whether or not the stripe block N corresponds to the parity part (S63).

In a case where the result of this determination is that the stripe block N corresponds to the parity part (S63: Yes), the relevant stripe block N can be predicted to be a data area whose update frequency is relatively high (Hot area), and as such, the FM controller 131 uses the FM block management table 134B to determine whether or not a Hot area write-in-progress block exists, that is, whether or not the block utilization type is write-in-progress, and, in addition, whether or not there is a block having a block attribute of Hot (S64).

In a case where the result of the determination is that a Hot area write-in-progress block exists (S64: Yes), the FM controller 131 decides that the first write page of the relevant Hot area write-in-progress block will be the write-destination physical page, and allocates this page (S65). Furthermore, in a case where there are multiple Hot area write-in-progress blocks, the FM controller 131 may make a list of these blocks and decide on a write-destination block by selecting these blocks in round robin fashion.

Alternatively, in a case where a Hot area write-in-progress block does not exist in Step S64 (S64: No), the FM controller 131 allocates a write-destination FM block by executing an unused block allocation process (Hot area) (FIG. 15A) (S66). Next, the FM controller 131 changes the block utilization type corresponding to the allocated FM block of the FM block management table 134B from unused to write-in-progress and also changes the block attribute to Hot (S67), subtracts 1 from the corresponding number of blocks in the block type unused and adds 1 to the corresponding number of blocks in the block type Hot area write-in-progress in the number of blocks management table 134C (S68), moves to Step S65, and decides on the first write page of the allocated FM block as the write-destination page and allocates this page.

Alternatively, in a case where the determination in Step S63 is that the stripe block N does not correspond to the parity part (S63: No), the relevant stripe block N can be predicted to be an area with a Normal update frequency (Normal area), and as such, the FM controller 131 uses the FM block management table 134B to determine whether or not there is a Normal area write-in-progress block, that is, whether or not the block utilization type is write-in-progress, and, in addition, whether or not the there is a block with a block attribute of Normal (S69).

In a case where the result is that a normal area write-in-progress block exists (S69: Yes), the FM controller 131 decides on the first write page of the relevant Normal area write-in-progress block as the write-destination physical page and allocates this page (S70). In a case where there are multiple normal area write-in-progress blocks, the FM controller 131 may make a list of these blocks and decide on a write-destination block by selecting these blocks in round robin fashion.

Alternatively, in a case where a Normal area write-in-progress block does not exist in Step S69 (S69: No), the FM controller 131 allocates a write-destination FM block by executing an unused block allocation process (Normal area) (FIG. 15B) (S71). Next, the FM controller 131 changes the block utilization type corresponding to the allocated FM block of the FM block management table 134B from unused to write-in-progress and also changes the block attribute to Normal (S72), subtracts 1 from the corresponding number of blocks in the block type unused and adds 1 to the corresponding number of blocks in the block type Normal area write-in-progress in the number of blocks management table 134C (S73), moves to Step S70, and decides on the first write page of the allocated FM block as the write-destination page and allocates this page.

In accordance with this processing, it is possible to consolidate the parity parts, whose update frequencies are predicted to be relatively high, in the same block. Consolidating the parity parts, whose update frequencies are predicted to be relatively high, in the same block like this enables a write to all pages inside a block to be completed relatively quickly, and in the case of a write-complete state, increases the likelihood of all the pages becoming invalid relatively quickly. Therefore, in the reclamation process, which will be described further below, there is no need to carry out a process for saving valid pages remaining inside the block to another block, making it possible to reduce the wasteful utilization of a page by the same data being written to another block once again.

Figure 15A:
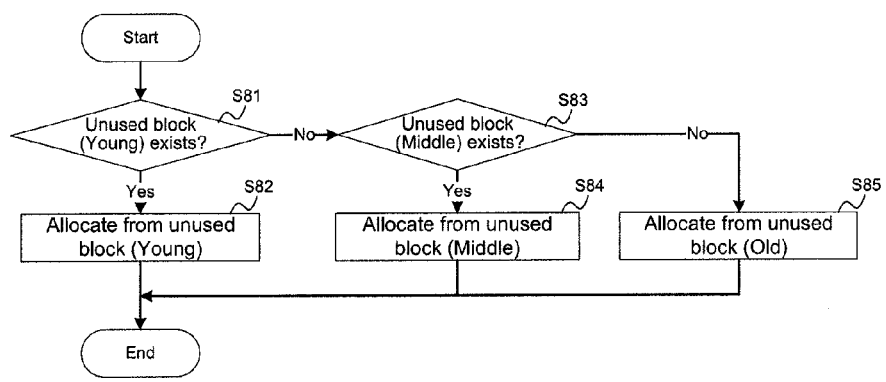
FIG. 15A shows a flowchart of an unused block allocation process (Hot area).
Figure 15B:
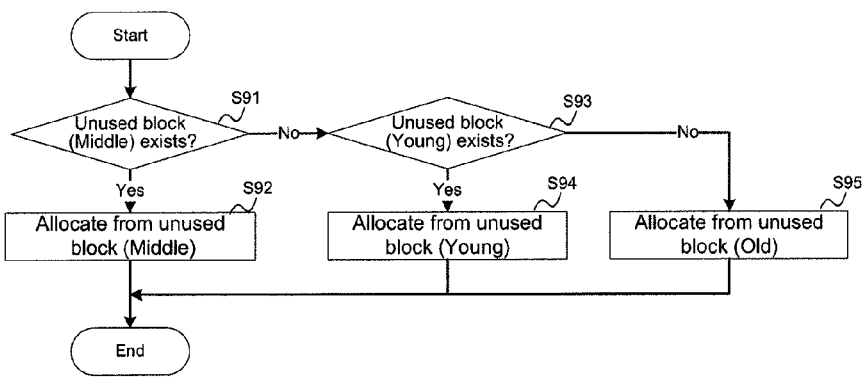
FIG. 15B shows a flowchart of an unused block allocation process (Normal area).

FIG. 15 is flowcharts of unused block allocation processes. FIG. 15A shows a flowchart of an unused block allocation process (Hot area), and FIG. 15B shows a flowchart of an unused block allocation process (Normal area).

The unused block allocation process (Hot area) shown in FIG. 15A is a process for allocating an unused block to a data area (Hot area) whose update frequency is relatively high. First, the FM controller 131 refers to the FM block management table 134B to determine whether or not there is a block whose block utilization type is unused (Young) (unused block (Young)) (S81), and in a case where it is determined that there are one or more unused blocks (Young) (S81: Yes), the FM controller 131 allocates a block from thereamong as the write-destination block (S82).

Alternatively, in a case where the determination in Step S81 is that one or more unused blocks (Young) do not exist (S81: No), the FM controller 131 refers to the FM block management table 134B to determine whether or not there is a block whose block utilization type is unused (Middle) (unused block (Middle)) (S83), and in a case where it is determined that there are one or more unused blocks (Middle) (S83: Yes), the FM controller 131 allocates a block from thereamong as the write-destination block (S84), and alternatively, in a case where the determination is that one or more unused blocks (Middle) do not exist (S83: No), the FM controller 131 allocates a remaining block, that is, a block from among the blocks whose block utilization type is unused (Old) (unused block (Old)) as the write-destination block (S85). Furthermore, as a method for deciding on a block to be allocated from among multiple unused blocks as the write-destination block, it is possible to create a list of blocks arranged in order of number of erases and to decide on a block from among those with a small number of erases.

In accordance with the above-described processing, it is possible to preferentially allocate an unused block with a small number of erases to a data area whose update frequency is relatively high. The remaining number of erases of the FM blocks in the FMPK can thus be wear leveled, making it possible to prolong the life of the FMPK.

The unused block allocation process (Normal area) shown in FIG. 15B is a process for allocating an unused block to a data area (Normal area) whose update frequency is normal. First, the FM controller 131 refers to the FM block management table 134B to determine whether or not there is a block whose block utilization type is unused (Middle) (unused block (Middle)) (S91), and in a case where it is determined that there are one or more unused blocks (Middle) (S91: Yes), the FM controller 131 allocates a block from thereamong as the write-destination block (S92).

Alternatively, in a case where the determination in Step S91 is that one or more unused blocks (Middle) do not exist (S91: No), the FM controller 131 refers to the FM block management table 134B to determine whether or not there is a block whose block utilization type is unused (Young) (unused block (Young)) (S93), and in a case where it is determined that there are one or more unused blocks (Young) (S93: Yes), the FM controller 131 allocates a block from thereamong as the write-destination block (S94), and alternatively, in a case where the determination is that one or more unused blocks (Young) do not exist (S93: No), the FM controller 131 allocates a remaining block, that is, a block from among the blocks whose block utilization type is unused (Old) (unused block (Old)) as the write-destination block (S95). Furthermore, as a method for deciding on a block to be allocated from among multiple unused blocks as the write-destination block, it is possible to create a list of blocks arranged in order of number of erases and to decide on a block from among those with a small number of erases.

Figure 16A:
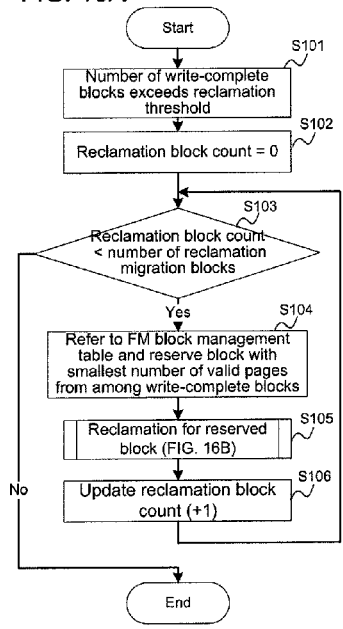
FIG. 16A is a flowchart of the reclamation process.
Figure 16B:
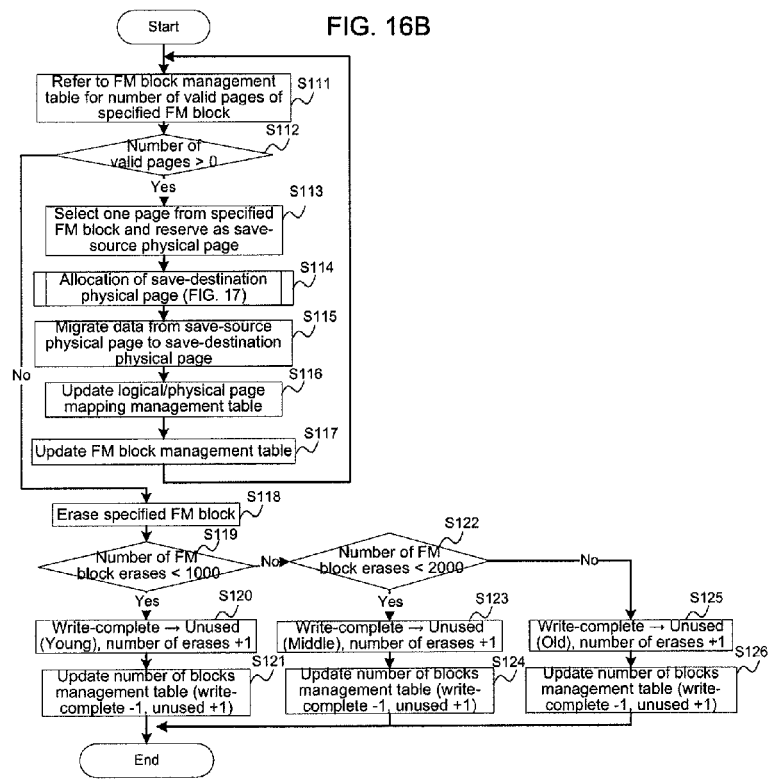
FIG. 16B is a flowchart of the reserved block reclamation process.

FIG. 16 is flowcharts of reclamation processes. FIG. 16A is a flowchart of the reclamation process, and FIG. 16B is a flowchart of the reserved block reclamation process.

In the reclamation process, the FM controller 131 acquires the number of write-complete blocks from the number of blocks management table 134C, that is, the number of blocks corresponding to the block type write-complete, and upon determining that the number of write-complete blocks exceeds a threshold that has been set in the reclamation threshold 134D (S101), sets the reclamation block count, which denotes the number of reclaimed blocks, in the memory 134 as 0 (S102).

Next, the FM controller 131 determines whether or not the reclamation block count is smaller than the number of reclamation migration blocks (S103). When the result is that the reclamation block count is smaller than the number of reclamation migration blocks (S103: Yes), this signifies that the number of erased blocks is insufficient, and as such, the FM controller 131 refers to the FM block management table 134B to reserve from among the write-complete blocks a block with the fewest number of valid pages (S104), and alternatively, when the result is that the reclamation block count is equal to or larger than the number of reclamation migration blocks (S103: No), this signifies that the number of erased blocks has reached a predetermined number, and as such, the FM controller 131 ends the reclamation process.

In a case where a block with the fewest valid pages is reserved in Step S104, the FM controller 131 executes the reserved block reclamation process (FIG. 16B), which executes a reclamation for the reserved block (S105), adds 1 to the reclamation block count (S106), and returns to Step S103. In accordance with the above-described processing, an erase is executed for the block(s) corresponding to the number of reclamation migration blocks, increasing the number of unused blocks.

Next, the reserved block reclamation process shown in FIG. 16B will be explained. In the reserved block reclamation process, the FM controller 131 acquires the number of valid pages in the reserved FM block from the FM block management table 134B (S111), and determines whether or not the number of valid pages is larger than 0 (S112).

When the determination is that the number of valid pages is larger than 0 (S112: Yes), this signifies that there is a valid page in the FM block, and as such, the FM controller 131 selects one valid page from the allocated FM block, and allocates this page as a save-source physical page (S113). Furthermore, whether or not a page is a valid page, for example, can be discerned in accordance with whether or not the page is associated with a logical page in the logical/physical page mapping management table 134A.

Next, the FM controller 131 executes a save-destination physical page allocation process (FIG. 17) to allocate a physical page (save-destination physical page) for saving the reserved save-source physical page (S114).

Next, the FM controller 131 migrates data from the save-source physical page to the allocated save-destination physical page (S115), associates the physical page # of the save-destination physical page with the logical page # associated with the save-source physical page in the logical/physical page mapping table 134A (S116), subtracts 1 from the number of valid pages of the FM block management table 134B (S117), returns to Step S111 and continues processing.

When the determination in Step S112 is that the number of valid pages is not larger than 0 (S112: No), this signifies that there are no valid pages in the FM block, and as such, the FM controller 131 executes an erase and changes this FM block into an unused block (S118).

Next, the FM controller 131 determines whether or not the number of erases of the erased FM block is smaller than 1,000 (S119), and in a case where it has been determined that the number of erases is smaller than 1,000 (S119: Yes), the FM controller 131 changes the block utilization type corresponding to the erased FM block in the FM block management table 134B from write-complete to unused (Young), adds 1 to the number of erases (S120), and, in addition, subtracts 1 from the number of blocks corresponding to write-complete in the number of blocks management table 134C, and adds 1 to the number of blocks corresponding to unused (S121).

In a case where the determination in Step S119 is that the number of erases is equal to or larger than 1,000 (S119: No), the FM controller 131 determines whether or not the number of erases of the erased FM block is smaller than 2,000 (S122), and in a case where it has been determined that the number of erases is smaller than 2,000 (S122: Yes), the FM controller 131 changes the block utilization type corresponding to the erased FM block in the FM block management table 134B from write-complete to unused (Middle), adds 1 to the number of erases (S123), and, in addition, subtracts 1 from the number of blocks corresponding to write-complete in the number of blocks management table 134C, and adds 1 to the number of blocks corresponding to unused (S124).

In a case where the determination in Step S122 is that the number of erases is equal to or larger than 2,000 (S122: No), the FM controller 131 changes the block utilization type corresponding to the erased FM block in the FM block management table 134B from write-complete to unused (Old), adds 1 to the number of erases (S125), and, in addition, subtracts 1 from the number of blocks corresponding to write-complete in the number of blocks management table 134C, and adds 1 to the number of blocks corresponding to unused (S126). According to this processing, a physical block, which was erased in the reclamation process, can be appropriately classified as any of three types in accordance with the number of erases. Furthermore, in this embodiment, since the FMs 136 are the same kind of chip and the limitation on the number of erases is the same for each FM 136, classification as to number of erases and classification as remaining to number of erases signifies the same thing. In a case where the limitation on number of erases for FMs 136 differs, classification by remaining number of erases makes it possible to classify a physical block appropriately according to the number of erases that remain.

Figure 17:
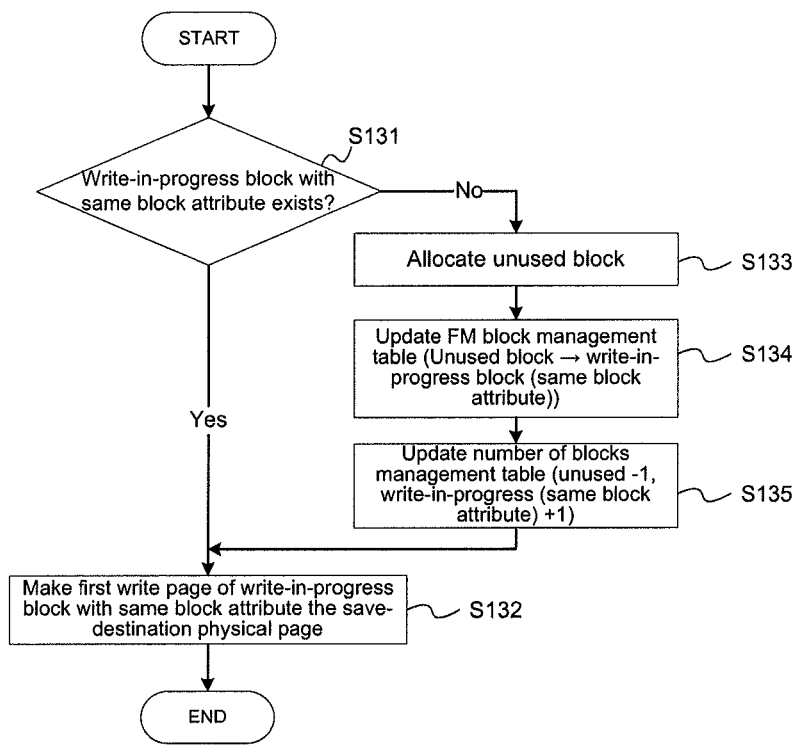
FIG. 17 is a flowchart of a save-destination physical page allocation process.

FIG. 17 is a flowchart of a save-destination physical page allocation process.

In the save-destination physical page allocation process, the FM controller 131 refers to the FM block management table 134B to determine whether or not there exist a write-in-progress block with the same block attribute as the reserved FM block (S131). In a case where the result of this determination is that a write-in-progress block having the same block attribute as the reserved FM block exists (S131: Yes), the FM controller 131 decides on the first write page of the write-in-progress block with the same block attribute as the save-destination physical page (S132), and ends this processing.

Alternatively, in a case where it is determined that a write-in-progress block having the same block attribute as the allocated FM block does not exist (S131: No), the FM controller 131 allocates an unused block as the save-destination block (S133). In a case where the block attribute of the allocated FM block here is Hot, the FM controller 131 preferentially allocates an unused (Young) block, and in a case where it is not, searches for a block to allocate in the sequence of unused (Middle) and unused (Old), and allocates the first block it finds.

Next, the FM controller 131 changes the block utilization type in the FM block management table 134B corresponding to the block that was allocated in Step S133 from an unused block to a write-in-progress block, converts the block attribute to the block attribute of the save-source block (S134), and, in addition, subtracts 1 from the number of blocks corresponding to unused in the number of blocks management table 134C, adds 1 to the number of blocks corresponding to write-in-progress having the same block attribute (S135), and moves to Step S132.

According to this processing, a page in a block that has become an erase target has a higher likelihood of being consolidated in the same block attribute write-in-progress block, that is, a block in which pages that are predicted to have the same update frequency are stored. This makes it possible to quickly complete a write to all pages inside the save-destination block, and in the case of the write-complete state, increases the likelihood that all the pages will become invalid relatively quickly. Therefore, in subsequent reclamation processes, the likelihood of performing processing for saving a valid page that remains inside a block to another block can be lowered, making it possible to reduce the wasteful utilization of a page by the same data being written to another block once again.

Next, an information processing system related to a second embodiment of the present invention will be explained.

The information processing system related to the second embodiment has substantially the same hardware configuration as the information processing system related to the first embodiment shown in FIG. 1, and as such, for descriptive purposes, the same parts will be explained using the reference signs denoted in the first embodiment.

In the information processing system related to the first embodiment described hereinabove, the configuration is such that the RAID controller 110 sends required information from the FMPK LU configuration management table to the FM controller 131, and the FM controller 131 uses this information to determine whether or not the write data is the parity part and controls the data write in accordance therewith. Alternatively, the information processing system related to the second embodiment is configured such that the RAID controller 110 side, at the time of a write, sends a command that comprises frequency prediction information that enables the prediction of the write data update frequency, and the FM controller 131, based on the frequency prediction information in the write command, controls the data write by predicting the update frequency. This makes it possible to simplify the processing of the FM controller 131 side, thereby reducing the processing load.

Figure 18:
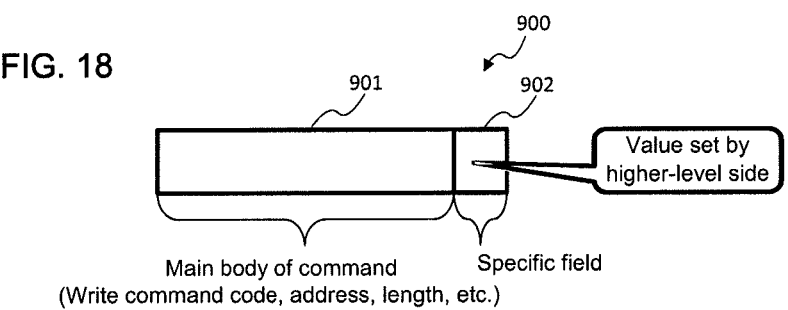
FIG. 18 is a block diagram of a command related to a second embodiment of the present invention.

FIG. 18 is a block diagram of a command related to the second embodiment of the present invention. A command 900, which is sent from the RAID controller 110 to the FM controller 131, is an SCSI (Small Computer System Interface) command, and includes the main body of the command 901, which stores the write command code, the write-destination address (for example, the LBA), the length and so forth, and an specific field 902. The specific field 902, for example, is a Vendor Specific field of the SCSI CDB (Command Descriptor Block), that is, a field that the vendor can use freely. In this embodiment, the specific field 902 is configured so that the higher-level apparatus stores a two-bit frequency prediction parameter (frequency prediction information), for example, "11" (Hot attribute), which indicates that the update frequency is predicted to be high; "00" (Normal attribute), which indicates that the update frequency is predicted to be normal; and "01" (Cold attribute), which indicates that the update frequency is predicted to the low. Furthermore, the default for the specific field 902 is "00" (Normal attribute).

Figure 19:
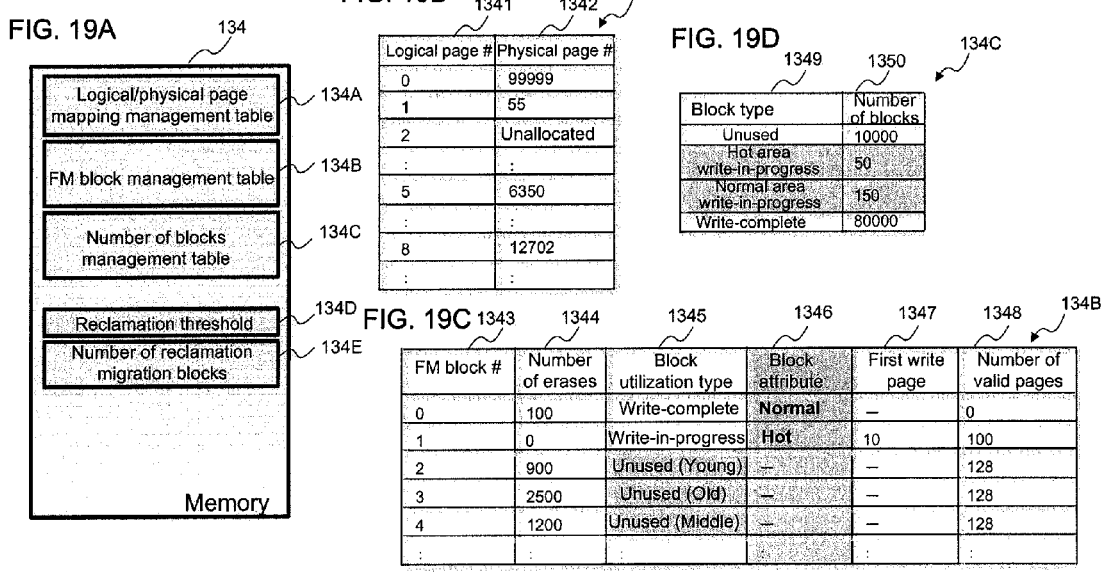
FIG. 19A shows the memory 134 inside the FM controller 131 of the FMPK 130.
FIG. 19B shows an example of the configuration of a logical/physical page mapping management table.
FIG. 19C shows an example of the configuration of a FM block management table.
FIG. 19D shows an example of the configuration of a number of blocks management table.

FIG. 19 is a diagram related to the second embodiment of the present invention illustrating the memory inside the FMPK and tables that are stored in the memory. FIG. 19A shows the memory 134 inside the FM controller 131 of the FMPK 130, FIG. 19B shows an example of the configuration of a logical/physical page mapping management table, FIG. 19C shows an example of the configuration of a FM block management table, and FIG. 19D shows an example of the configuration of a number of blocks management table.

The FMPK 130 memory 134 of the second embodiment, with the exception of the FMPK LU configuration management table 134F, stores the same types of tables as the tables stored in the FMPK 130 memory 134 of the first embodiment shown in FIG. 7A.

Figure 20:
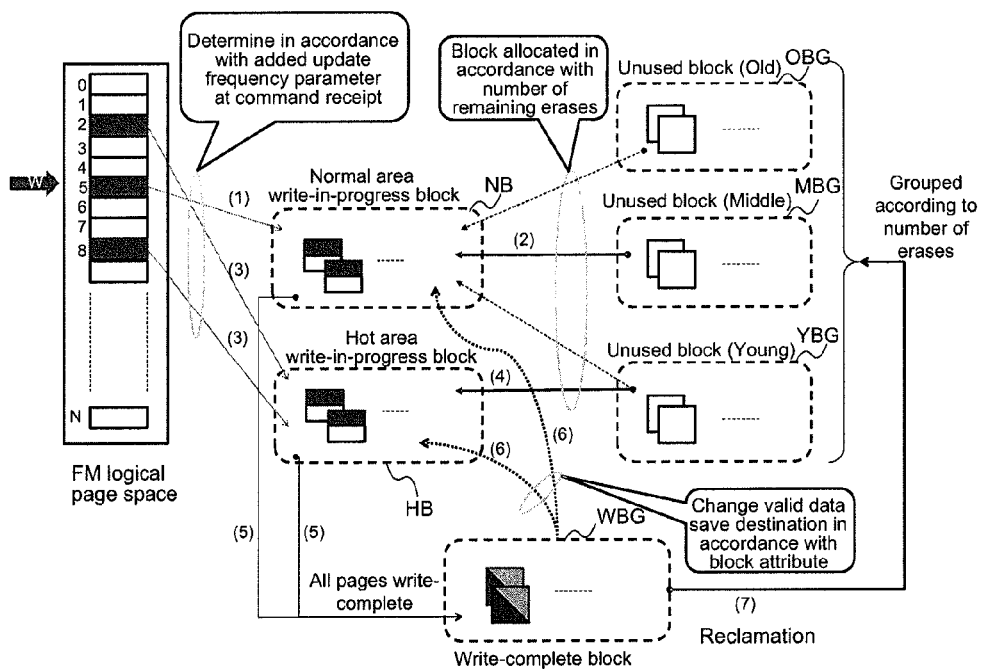
FIG. 20 is a diagram illustrating an overview of processing in a FMPK related to the second embodiment of the present invention.

FIG. 20 is a diagram illustrating an overview of the processing of the FMPK related to the second embodiment of the present invention.

The overview of the processing of the FMPK 130 related to the second embodiment is the same as that of the processing of the FMPK 130 related to the first embodiment shown in FIG. 13 except for the processes (1) and (3) in the drawings, which differ. The FM controller 131 of the FMPK 130 related to the second embodiment, upon receiving a write request (write command) from the RAID controller 110, determines, based on the update frequency parameter of the specific field 902 of the command, whether the write data is data whose update frequency is predicted to be normal, or data whose update frequency is predicted to be relatively high. Then, in a case where the determination is that the update frequency of the data is predicted to be normal, the FM controller 131 stores the data in a Normal area write-in-progress block NB ((1) in the drawing). Alternatively, in a case where the determination is that the update frequency of the data is predicted to be relatively high, the FM controller 131 stores the data in a Hot area write-in-progress block HB ((3) in the drawing).

Figure 21A:
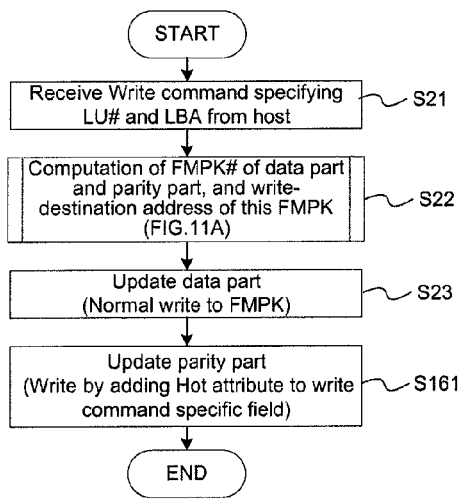
FIG. 21A is a flowchart of a LU write process in accordance with the RAID controller 110.
Figure 21B:
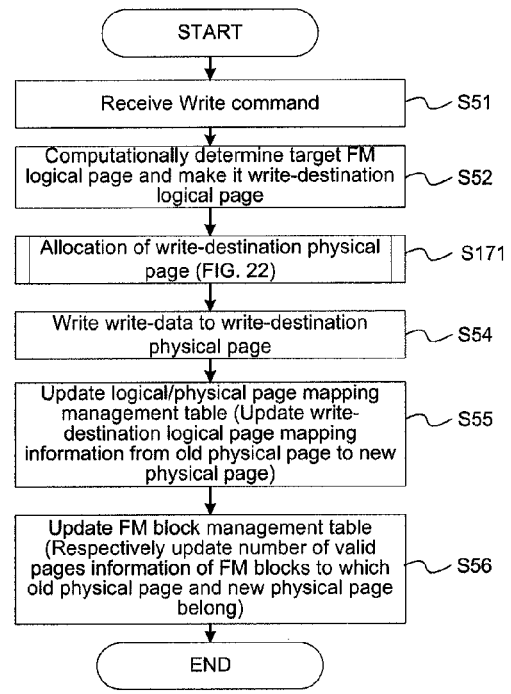
FIG. 21B is a flowchart of a write process.

FIG. 21 is a flowchart of a write process to the FMPK and a write process in the FMPK related to the second embodiment of the present invention. FIG. 21A is a flowchart of a LU write process in accordance with the RAID controller 110, and the same reference signs are used for parts that are the same as the LU write process related to the first embodiment shown in FIG. 10. FIG. 21B is a flowchart of a write process, and the same reference signs are used for parts that are the same as the write process related to the first embodiment shown in FIG. 14A.

In the LU write process related to the second embodiment, after Step S23, the RAID controller 110 uses the computed FMPK # and write-destination address to create a write command for writing a parity part to the FMPK 130, and, in addition, writes the parity part by adding the Hot attribute, which denotes that the update frequency is predicted to be relatively high, to the specific field 902 of the write command, and sending this write command to the FMPK 130 (S161). Furthermore, since the RAID controller 110 discerns whether or not the data to be written is the parity part, Step S161 can be executed without complicated processing.

In the write process related to the second embodiment, unlike the first embodiment, the write-destination physical page allocation process (FIG. 22) is executed subsequent to Step S52.

Figure 22:
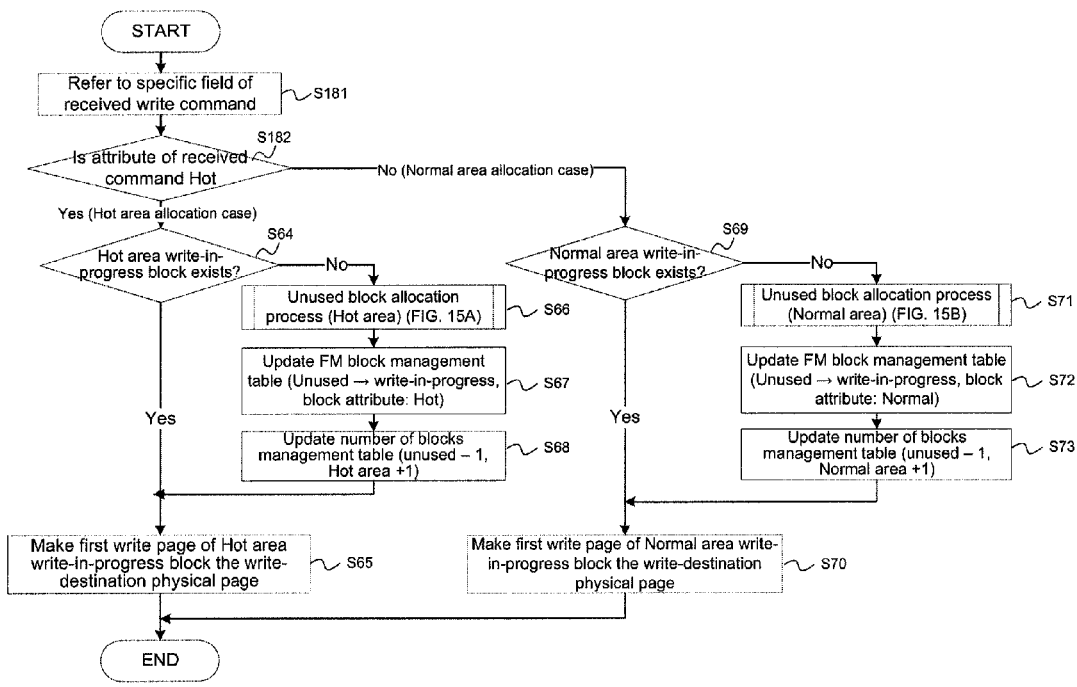
FIG. 22 is a flowchart of a write-destination physical page allocation process related to the second embodiment of the present invention.

FIG. 22 is a flowchart of the write-destination physical page allocation process related to the second embodiment of the present invention. Furthermore, in this drawing, the same reference signs are used with respect to parts that are the same as the write-destination physical page allocation process related to the first embodiment shown in FIG. 14B.

In the write-destination physical page allocation process related to the second embodiment, the FM controller 131 refers to the specific field 902 of the write command received from the RAID controller 110 (S181) to determine whether or not the attribute stored in the specific field 902 is the Hot attribute (S182). In a case where the result of this determination is the Hot attribute (S812: Yes), the FM controller 131 executes the processing from Step S64, and alternatively, when the result of the determination is not the Hot attribute (S182: No), executes the processing from Step S69.

According to this process, the FM controller 131 can easily and quickly discern whether or not the write data attribute is Hot from the specific field 902 of the write command, thereby making it possible to reduce the processing load on the FM controller 131.

Next, an information processing system related to a third embodiment of the present invention will be explained. Furthermore, the explanation will be given using the same reference signs for parts that are the same as the first embodiment and the second embodiment.

Whereas in the second embodiment the configuration is such that the RAID controller 110 uses a command to send frequency prediction information to the FMPK 130, and the FM controller 131 of the FMPK 130 controls the data write by predicting the update frequency based on the frequency prediction information in the write command, the information processing system related to the third embodiment is configured such that the host uses a command to send frequency prediction information, and the FM controller 131 of the FMPK 130 controls the data write by predicting the update frequency based on the frequency prediction information in the write command.

Figure 23:
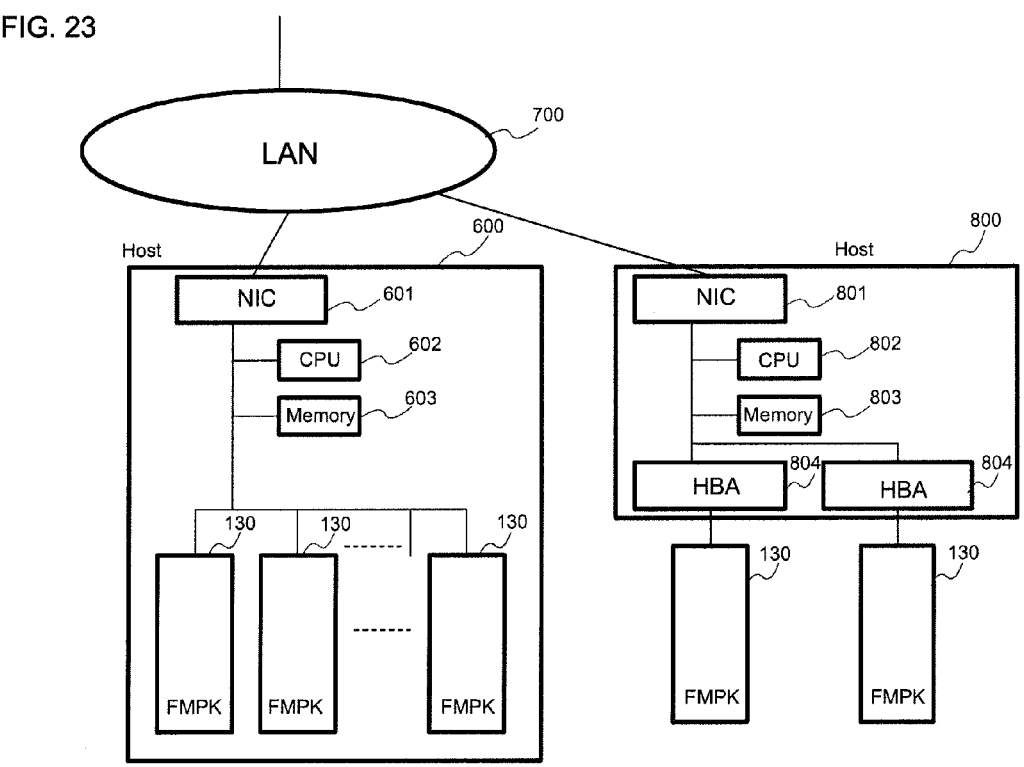
FIG. 23 is a block diagram of an entire information processing system related to a third embodiment of the present invention.

FIG. 23 is a block diagram of an entire information processing system related to the third embodiment of the present invention.

The information processing system comprises a host (one example of a storage system) 600, a host 800, and multiple FMPKs 130. The host 600 and the host 800, for example, are coupled via a LAN 700. Furthermore, an external apparatus not shown in the drawing is coupled to the LAN 700. The multiple FMPKs 130 are coupled to the host 800.

The host 600 comprises a NIC 601, a CPU 602, a memory 603, and multiple FMPKs 130. The NIC 601 mediates communications with the other apparatus via the LAN 700. The CPU 602 performs various types of control processing by executing a program stored in the memory 603.

The host 800 comprises a NIC 801, a CPU 802, a memory 803, and multiple HBAs (Host Bus Adapters) 804. The NIC 801 mediates communications with the other apparatus via the LAN 700. The CPU 802 performs various types of control processing by executing a program stored in the memory 803. The HBA 804 mediates communications with the FMPK 130.

Figure 24A:
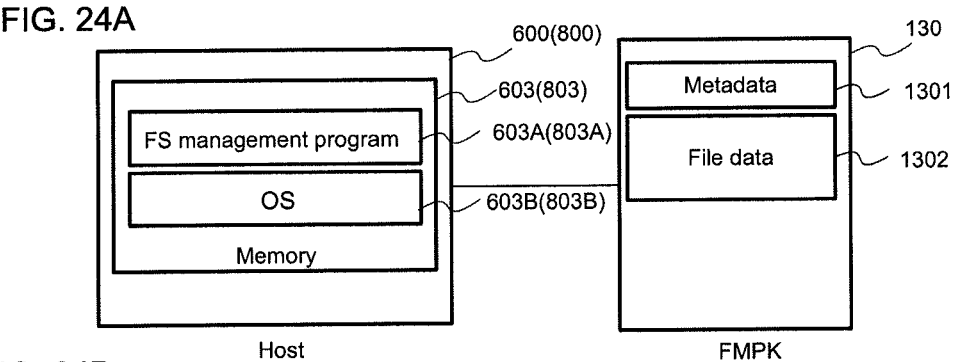
FIG. 24A shows the status of the host and the FMPK 130 when a FS (File System) has been constructed.
Figure 24B:
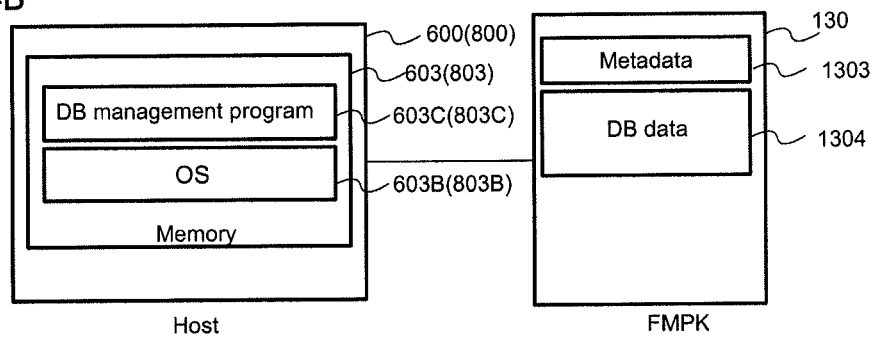
FIG. 24B shows the status of the host and the FMPK 130 when a DB (Data Base) has been constructed.

FIG. 24 is a diagram illustrating the configurations of hosts and FMPKs related to the third embodiment of the present invention. FIG. 24A shows the status of the host and the FMPK 130 when a FS (File System) has been constructed, and FIG. 24B shows the status of the host and the FMPK 130 when a DB (Data Base) has been constructed.

When constructing a FS in the host 600 (800), a FS management program 603A (803A) for managing a file system and an OS (Operating System) 603B (803B) are stored in the memory 603 (803) of the host 600 (800) as shown in FIG. 24A. For its part, the FMPK 130 stores metadata 1301, which is data for managing the actual data (for example, the size of the actual data, an update time, and so forth), and file data 1302, which is the actual data of a file.

Since the metadata 1301 here is data that is updated every time the file is updated, it is data that is predicted to have a high update frequency. Consequently, in this embodiment, the configuration is such that the CPU 602 (802) of the host 600 (800) adds the frequency prediction information, which denotes that the update frequency is relatively high, specifically, the Hot attribute, to the command 900 (same as FIG. 18) that it sends to the FMPK 130 when writing the metadata 1301.

When constructing a DB in the host 600 (800), an OS (Operating System) 603B (803B) and a DB management program 603C (803C) for managing a DB are stored in the memory 603 (803) of the host 600 (800) as shown in FIG. 24B. For its part, the FMPK 130 stores metadata 1303, which is data for managing DB data (for example, the size of the DB data, an update time, and so forth), and the DB data 1304, which is the actual data of the DB.

Since the metadata 1303 here is data that is updated every time the DB data is updated, it is data that is predicted to have a high update frequency. Consequently, in this embodiment, the configuration is such that the CPU 602 (802) of the host 600 (800) adds the frequency prediction information, which denotes that the update frequency is relatively high, specifically, the Hot attribute, to the command 900 (same as FIG. 18) that it sends to the FMPK 130 when writing the metadata 1303.

Figure 25A:
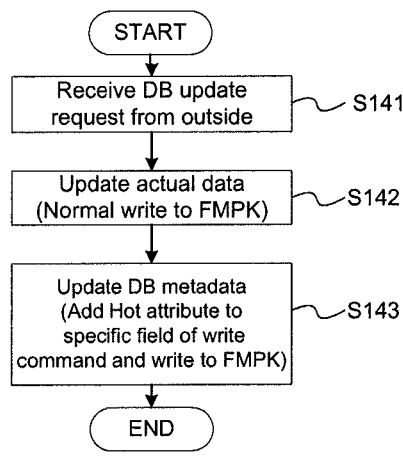
FIG. 25A shows a host command issuing process that is executed by the host 600 (800) that constructed a DB.
Figure 25B:
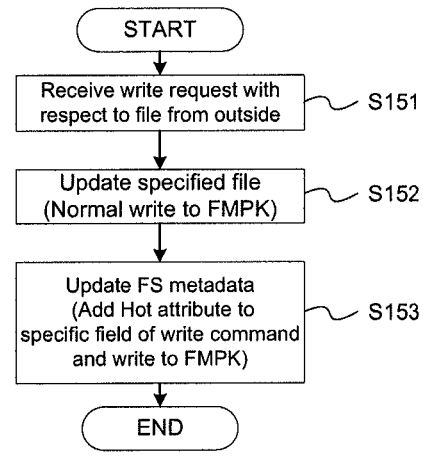
FIG. 25B shows a host command issuing process that is executed by the host 600 (800) that constructed a FS.

FIG. 25 is flowcharts of host command issuing processes related to the third embodiment of the present invention. FIG. 25A shows a host command issuing process that is executed by the host 600 (800) that constructed a DB, and FIG. 25B shows a host command issuing process that is executed by the host 600 (800) that constructed a FS.

When the host 600 (800) that constructed the DB receives a DB update request from an external apparatus (S141), the CPU 602 (802) executes an update of the actual data in accordance with sending a write command for updating the actual data of the DB to the FMPK 130 (S142). Next, the CPU 602 (802) adds the Hot attribute to the specific field 902 of the write command 900 for updating the DB metadata, and executes metadata updating in accordance with sending the relevant write command 900 to the FMPK 130 (S143). Furthermore, the operation of the FMPK 130 upon having received the write command 900 is the same as the operation of the FMPK 130 related to the second embodiment shown in FIG. 21B.

According to the process described hereinabove, the host 600 (800) can send frequency updating information to the FMPK 130 in accordance with a simple process the adds the Hot attribute to a write command for updating the metadata, making it possible to reduce the processing load related to the host 600 (800).

When the host 600 (800) that constructed the FS receives a write request with respect to a file from an external apparatus (S151), the CPU 602 (802) executes an update of the file data in accordance with sending a write command for updating the file data to the FMPK 130 (S152). Next, the CPU 602 (802) adds the Hot attribute to the specific field 902 of the write command 900 for updating the FS metadata, and executes metadata updating in accordance with sending the relevant write command 900 to the FMPK 130 (S153). Furthermore, the operation of the FMPK 130 upon having received the write command 900 is the same as the operation of the FMPK 130 related to the second embodiment shown in FIG. 21B.

According to the process described hereinabove, the host 600 (800) can send frequency updating information to the FMPK 130 in accordance with a simple process the adds the Hot attribute to a write command for updating the metadata, making it possible to reduce the processing load related to the host 600 (800).

Next, an information processing system related to a fourth embodiment of the present invention will be explained. Furthermore, the explanation will be given using the same reference signs with respect to parts that are the same as the first to the third embodiments.

In the third embodiment, the higher-level apparatus adds frequency prediction information, which indicates that the update frequency is predicted to be high, to a write command with respect to data that is predicted to have a high update frequency, and the FM controller 131 of the FMPK 130 controls the data write by predicting the update frequency based on the frequency prediction information in the write command. Alternatively, in the fourth embodiment, with respect to data that is predicted to have a low update frequency, the higher-level apparatus adds to a write command frequency prediction information indicating that the update frequency is predicted to be low, and the FM controller 131 of the FMPK 130 controls the data write by predicting the update frequency based on the frequency prediction information in the write command.

The information processing system related to the fourth embodiment features the same hardware configuration as the information processing system related to the third embodiment shown in FIG. 23.

Figure 26:
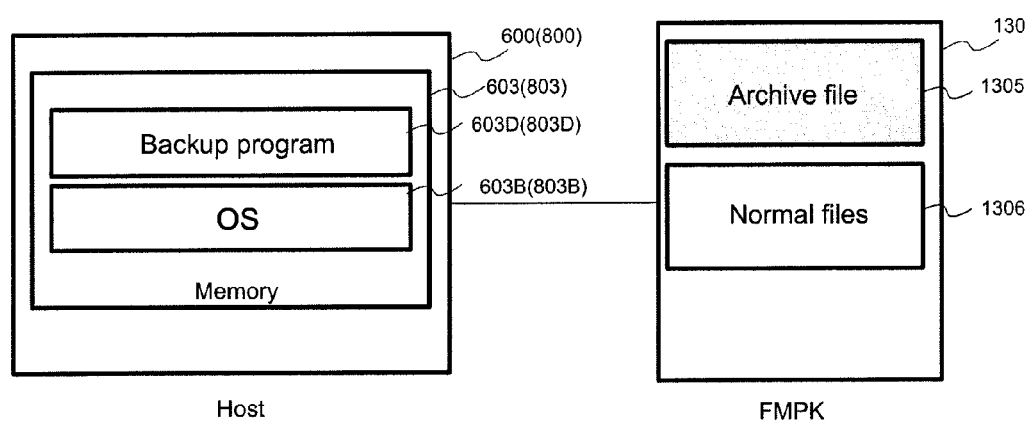
FIG. 26 is a diagram illustrating the configurations of a host and a FMPK related to a fourth embodiment of the present invention.

FIG. 26 is a diagram illustrating the configurations of a host and a FMPK related to the fourth embodiment of the present invention.

A backup system is constructed in the host 600 (800) related to the fourth embodiment, and an OS (Operating System) 603B (803B) and a backup program 603D (803D) that operates as a backup system are stored in the memory 603 (803) of the host 600 (800). For its part, the FMPK 130 stores a normal file 1306, which is stored in the file format as-is, and an archive file 1305, which bundle together multiple files and stores them in a compressed format.

Generally speaking, the archive file 1305 here most often is infrequently referenced files that are bundled together and compressed, and basically is predicted to have a lower update frequency than a normal file. Consequently, in this embodiment, the configuration is such that the CPU 602 (802) of the host 600 (800) adds frequency prediction information indicative of a relatively low update frequency, specifically, the Cold attribute, to a command that is sent to the FMPK 130 when writing to the archive file 1305.

FIG. 27 is a diagram illustrating the memory inside the FMPK related to the fourth embodiment of the present invention and the tables stored in the memory. FIG. 27A shows the memory 134 in the FM controller 131 of the FMPK 130, FIG. 27B shows an example of the configuration of the logical/physical page mapping management table, FIG. 27C shows an example of the configuration of the FM block management table, and FIG. 27D shows an example of the configuration of the number of blocks management table.

The memory 134 of the FMPK 130 related to the fourth embodiment stores tables of the same configurations as the tables stored in the memory related to the second embodiment shown in FIG. 19. A portion of the tables stored in the memory 134 may store information that differs from that of the tables stored in the memory related to the second embodiment. The parts for which the content differs will be explained here.

Block attribute information, which is determined by the update frequency of the data stored in the corresponding FM block 136B, is stored in the block attribute 1346 of the FM block management table 134B. In this embodiment, in a case where the update frequency of the data to be written is predicted to be low, Cold is set as the block attribute information, and in a case where the update frequency is predicted to be higher than that, Normal is set as the block attribute information.

In the number of blocks management table 134C, the utilization type includes unused, which is a state in which no data at all is written in the pages of the FM block 136B, that is, a state comprising only free pages; write-complete, which is a state in which writes have been carried out to all of the pages of the FM block 136B; Cold area write-in-progress, which is a state in which free pages and pages in which is written data predicted to have a low update frequency are intermixed in the FM block 136B; and Normal area write-in-progress, which is a state in which free pages and pages in which is written data predicted to have a normal update frequency are intermixed in the FM block 136B. For example, in this drawing, the number of unused blocks is 10,000, the number of Cold area write-in-progress blocks is 50, the number of Normal area write-in-progress blocks is 150, and the number of write-complete blocks is 80,000.

Figure 28:
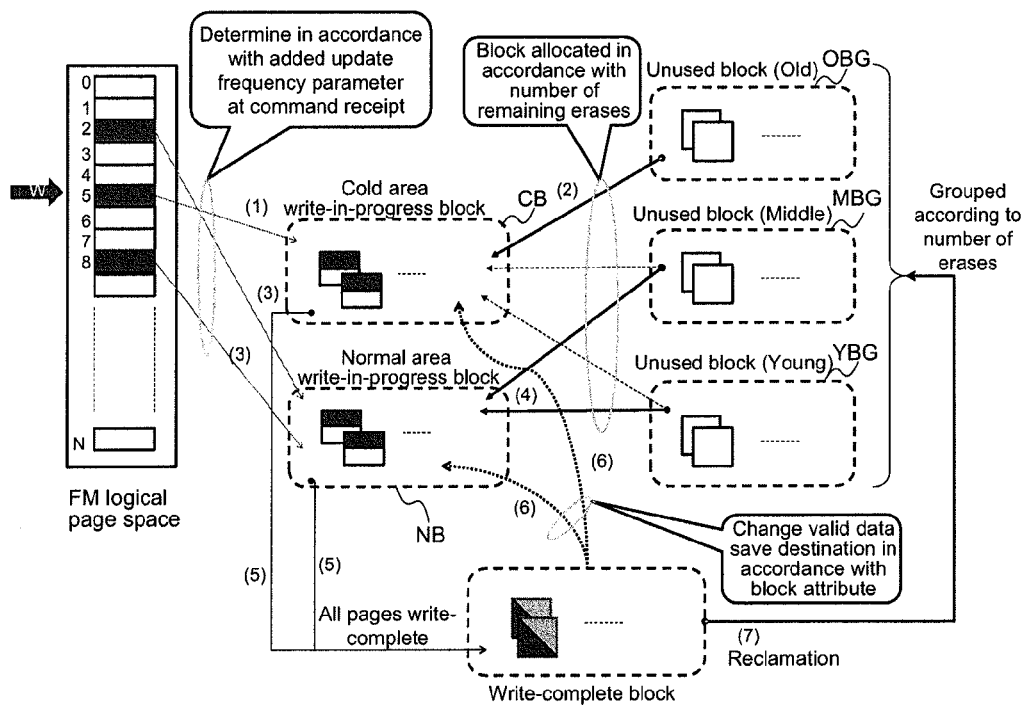
FIG. 28 is a diagram illustrating an overview of processing in the FMPK related to the fourth embodiment of the present invention.

FIG. 28 is a diagram illustrating an overview of the processing in the FMPK related to the fourth embodiment of the present invention.

The FM controller 131 of the FMPK 130, upon receiving a write request (write command) from the host CPU 602 (802), determines based on the update frequency parameter of the specific field 902 in the command whether the write data is data, which is predicted to have a relatively low update frequency, or data, which is predicted to have a normal update frequency. Then, in a case where it has been determined that the data is predicted to have a relatively low update frequency, the FM controller 131 stores the data in a Cold area write-in-progress block HB ((1) in the drawing). In a case where a Cold area write-in-progress block CB does not exist at this point, the FM controller 131 selects an unused block from the unused block (Old) group OBG, and allocates this unused block as the data write destination ((2) in the drawing). This makes it possible to consolidate data, which is predicted to have relatively low update frequencies, in the same block. Consolidating data predicted to have relatively low update frequencies in the same block like this reduces the likelihood that all the pages inside a block will become invalid. Therefore, in a reclamation process, which will be described further below, the likelihood of this block becoming the target of an erase can be lowered and the likelihood of carrying out a process for saving valid data remaining in the block to another block can be reduced, making it possible to reduce the wasteful utilization of a page by the same data being written to another block once again.

Alternatively, in a case where it has been determined that the data is predicted to have a normal update frequency, the FM controller 131 stores the data in a Normal area write-in-progress block NB ((3) in the drawing). In a case where a normal area write-in-progress block NB does not exist at this point, the FM controller 131 selects an unused block from either the unused block (Middle) group MBG or the unused block (Young) group YBG, and allocates this unused block as the data write destination ((4) in the drawing).

The FM controller 131, in a case where writing to all the pages inside a block is completed in accordance with writing data to either the Normal area write-in-progress block NB or the Cold area write-in-progress block CB, classifies this block in the write-complete block group WBG ((5) in the drawing).

Also, in a case where reclamation processing has started, the FM controller 131 selects from among the blocks in the write-complete block group WBG a block in which there are either no valid pages or few valid pages, and in a case where a valid page exists in the selected block, saves the relevant valid page to a write-in-progress block that has the same block attribute as the block attribute of the relevant block ((6) in the drawing). For example, in a case where the block attribute is Cold, the FM controller 131 saves the data to a Cold area write-in-progress block CB for which the block attribute is Cold, and in a case where the block attribute is normal, saves the data to a Normal area write-in-progress block NB for which the block attribute is Normal. This makes it possible for data having the same update frequency to be consolidated in the same block.

Next, after all the pages in the block have become invalid pages, the FM controller 131 erases all the data in the relevant block, changes the relevant block to an unused block, and groups the blocks together based on the number of erases ((7) in the drawing). This makes it possible to appropriately classify the respective blocks into multiple block groups in accordance with the remaining number of erases.

Figure 29A:
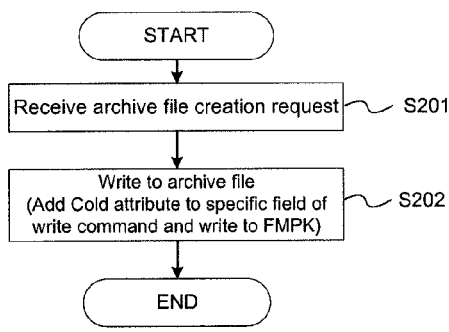
FIG. 29A shows a flowchart of the backup process.
Figure 29B:
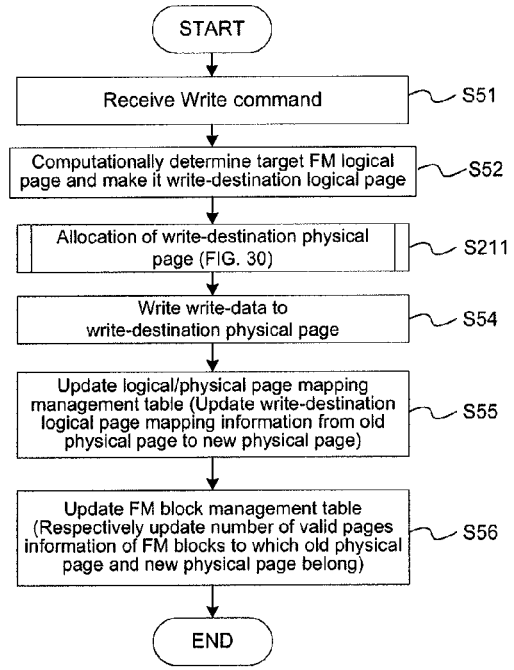
FIG. 29B is a flowchart of the write process.

FIG. 29 is flowcharts of a backup process and a write process in the FMPK related to the fourth embodiment of the present invention. FIG. 29A shows a flowchart of the backup process. FIG. 29B is a flowchart of the write process, and the same reference signs are used for the same parts as the write process related to the first embodiment shown in FIG. 14A.

When the host 600 (800) receives an archive creation request from an external apparatus (S201), the CPU 602 (802) executes an archive data write by adding the Cold attribute to the specific field 902 of the write command 900 for writing the archive data and sending the relevant write command 900 to the FMPK 130 (S202).

In the write process related to the fourth embodiment, a write-destination physical page allocation process (FIG. 30) is executed subsequent to Step S52 as shown in FIG. 29B (S211).

Figure 30:
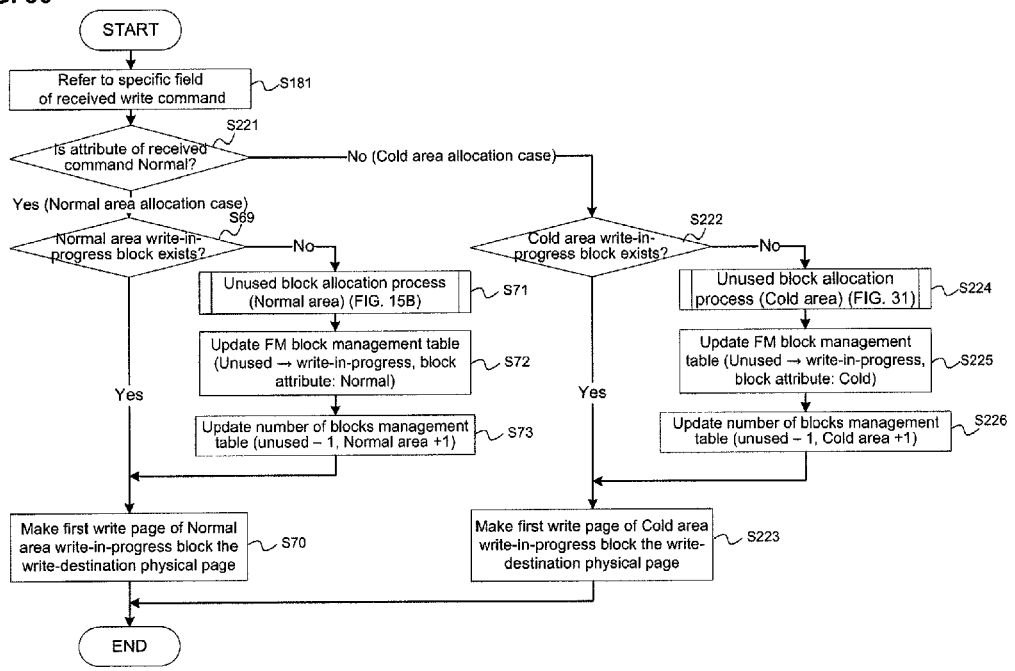
FIG. 30 is a flowchart of a write-destination physical page allocation process related to the fourth embodiment of the present invention.

FIG. 30 is a flowchart of a write-destination physical page allocation process related to the fourth embodiment of the present invention. Furthermore, in this drawing, the same reference signs are used with respect to the same parts as those in the write-destination physical page allocation processes shown in FIG. 14B and FIG. 22.

In the write-destination physical page allocation process related to the fourth embodiment, a determination is made as to whether or not the attribute stored in the specific field 902 referred to in Step S181 is the Normal attribute (S221). In a case where the result is the Normal attribute (S221: Yes), the FM controller 131 executes the processing from Step S69.

Alternatively, in a case where the attribute is not the Normal attribute (S221: No), the FM controller 131 uses the FM block management table 134B to determine whether or not there is a Cold area write-in-progress block, that is, whether or not the block utilization type is write-in-progress, and, in addition, whether or not there is a block with the block attribute of Cold (S222).

In a case where the result is a Cold area write-in-progress block (S222: Yes), the FM controller 131 makes the first write page of the relevant Cold area write-in-progress block the write-destination physical page and allocates this page (S223). Furthermore, in a case where there are multiple Cold area write-in-progress blocks, the FM controller 131 may make a list of these blocks and decide on a write-destination block by selecting these blocks in round robin fashion.

Alternatively, in a case where a Cold area write-in-progress block does not exist in Step S222 (S222: No), the FM controller 131 allocates a write-destination FM block by executing the unused block allocation process (Cold area) (FIG. 31) (S224). Next, the FM controller 131 changes the block utilization type corresponding to the allocated FM block of the FM block management table 134B from unused to write-in-progress and also changes the block attribute to Cold (S225), subtracts 1 from the corresponding number of blocks in the block type unused and adds 1 to the corresponding number of blocks in the block type Cold area write-in-progress in the number of blocks management table 134C (S226), moves to Step S223, makes the first write page of the allocated FM block the write-destination page, and allocates this page.

Figure 31:
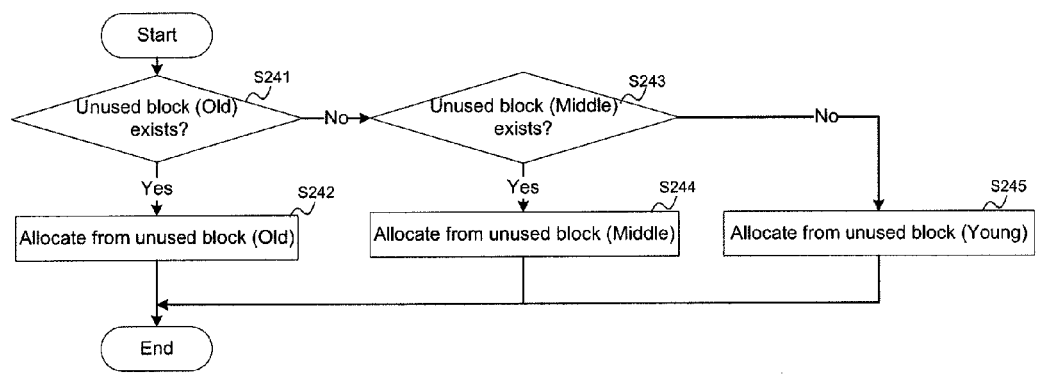
FIG. 31 is a flowchart of an unused block allocation process related to the fourth embodiment of the present invention.

FIG. 31 is a flowchart of an unused block allocation process related to the fourth embodiment of the present invention. FIG. 31 is a flowchart of the unused block allocation process (Cold area).

The unused block allocation process (Cold area) shown in FIG. 31 is a process for allocating an unused block to a data area with a relatively low update frequency (Cold area). First, the FM controller 131 refers to the FM block management table 134B, determines whether or not the block utilization type is unused (Old) (unused block (Old)) (S241), and in a case where it has been determined that there are one or more unused blocks (Old) (S224: Yes), allocates a block from thereamong as the write-destination block (S241).

Alternatively, in a case where it has been determined in Step S241 that one or more unused blocks (Old) do not exist (S241: No), the FM controller 131 refers to the FM block management table 134B to determine whether or not there is a block with the block utilization type unused (Middle) (unused block (Middle)) (S243), and in a case where it has been determined that there are one or more unused blocks (Middle) (S243: Yes), allocates a block from thereamong as the write-destination block (S244), and alternatively, in a case where it has been determined that one or more unused blocks (Middle) do not exist (S243: No), allocates a block from among the remaining blocks, that is, a block from among the blocks with the block utilization type unused (Young) (unused block (Young)) as the write-destination block (S245). Furthermore, as a method for deciding on a block to be allocated as the write destination from among multiple unused blocks, a list arranged in order of number of erases can be created, and a block can be decided on from those having a small number of erases.

According to the process described hereinabove, it is possible to preferentially allocate an unused block with a large number of erases to a data area having a relatively low update frequency. For this reason, the number of erases remaining in the FM blocks of the FMPK can be subjected to wear leveling, making it possible to prolong the life of the FMPK.

Next, an information processing system related to a fifth embodiment of the present invention will be explained. Furthermore, this explanation will be given using the same references signs with respect to the same parts as those of the first to the fourth embodiments.

In the fifth embodiment, the higher-level apparatus either adds to a write command frequency prediction information indicating that the update frequency is predicted to be high with respect to data that is predicted to have a high update frequency, or adds to a write command frequency prediction information indicating that the update frequency is predicted to be low with respect to data that is predicted to have a low update frequency, and sends this write command to the FMPK 130, and the FM controller 131 of the FMPK 130 controls the data write by predicting the update frequency based on the frequency prediction information in the write command.

The information processing system related to the fifth embodiment features the same hardware configuration as the information processing system related to the third embodiment shown in FIG. 23. Furthermore, the host 600 (800) related to the fifth embodiment comprises the functions of the host related to the third embodiment shown in FIG. 24, and the functions of the host related to the fourth embodiment shown in FIG. 26. That is, the host 600 (800) related to the fifth embodiment stores an OS 603B (803B), a FS management program 603A (803A) and/or a DB management program 603C (803C), and a backup program 603D (803D) in the memory 603 (803), and is able to execute the host command issuing processes shown in FIGS. 25A, 25B, and 29A.

Figure 32:
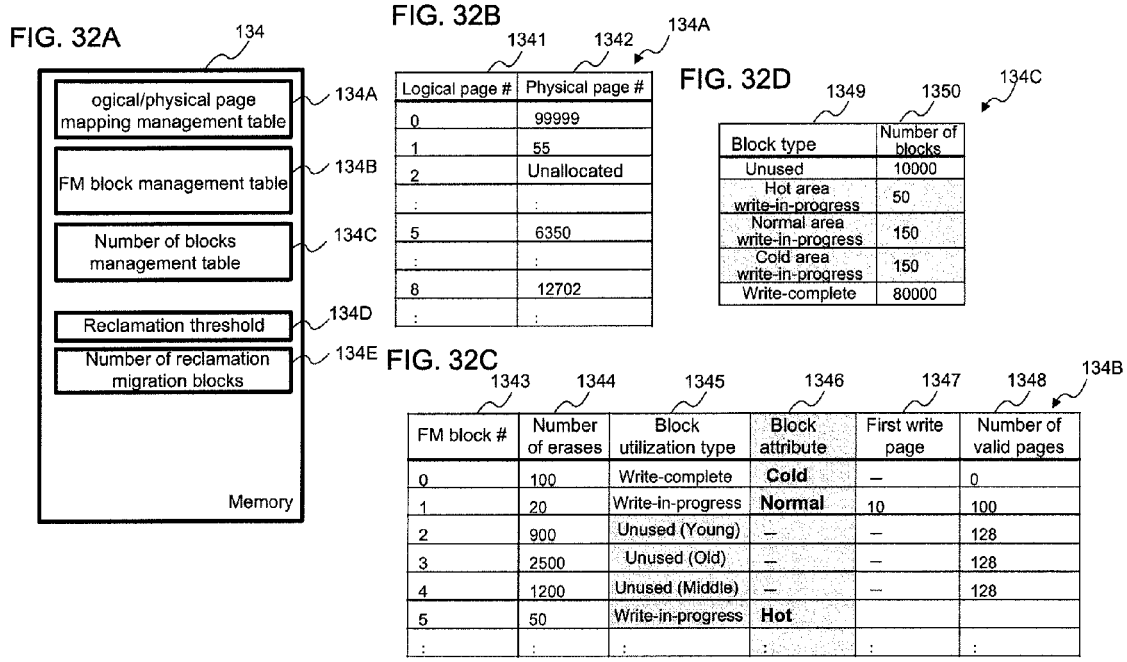
FIG. 32A shows the memory 134 in the FM controller 131 of the FMPK 130.
FIG. 32B shows an example of the configuration of the logical/physical page mapping management table.
FIG. 32C shows an example of the configuration of the FM block management table.
FIG. 32D shows an example of the configuration of the number of blocks management table.

FIG. 32 is a diagram illustrating the memory in the FMPK related to the fifth embodiment of the present invention and the tables stored in the memory. FIG. 32A shows the memory 134 in the FM controller 131 of the FMPK 130, FIG. 32B shows an example of the configuration of the logical/physical page mapping management table, FIG. 32C shows an example of the configuration of the FM block management table, and FIG. 32D shows an example of the configuration of the number of blocks management table.

The memory 134 of the FMPK 130 related to the fifth embodiment stores tables of the same configurations as the tables stored in the memory related to the second embodiment shown in FIG. 19. A portion of the tables stored in the memory 134 may store information that differs from that of the tables stored in the memory related to the second embodiment. The parts for which the content differs will be explained here.

Block attribute information, which is determined by the update frequency of the data stored in the corresponding FM block 136B, is stored in the block attribute 1346 of the FM block management table 134B. As the block attribute information in this embodiment, Hot is set in a case where the update frequency of the data to be written is predicted to be high, Cold is set in a case where the update frequency of the data to be written is predicted to be low, and Normal is set in a case where the update frequency is predicted to be normal.

In the number of blocks management table 134C, the utilization type includes unused, which is a state in which no data at all is written in the pages of the FM block 136B, that is, a state comprising only free pages; write-complete, which is a state in which writes have been carried out to all of the pages of the FM block 136B; Hot area write-in-progress, which is a state in which free pages and pages in which is written data predicted to have a high update frequency are intermixed in the FM block 136B; Cold area write-in-progress, which is a state in which free pages and pages in which is written data predicted to have a low update frequency are intermixed in the FM block 136B; and Normal area write-in-progress, which is a state in which free pages and pages in which is written data predicted to have a normal update frequency are intermixed in the FM block 136B. For example, in this drawing, the number of unused blocks is 10,000, the number of Hot area write-in-progress blocks is 50, the number of Normal area write-in-progress blocks is 150, the number of Cold area write-in-progress blocks is 150, and the number of write-complete blocks is 80,000.

Figure 33:
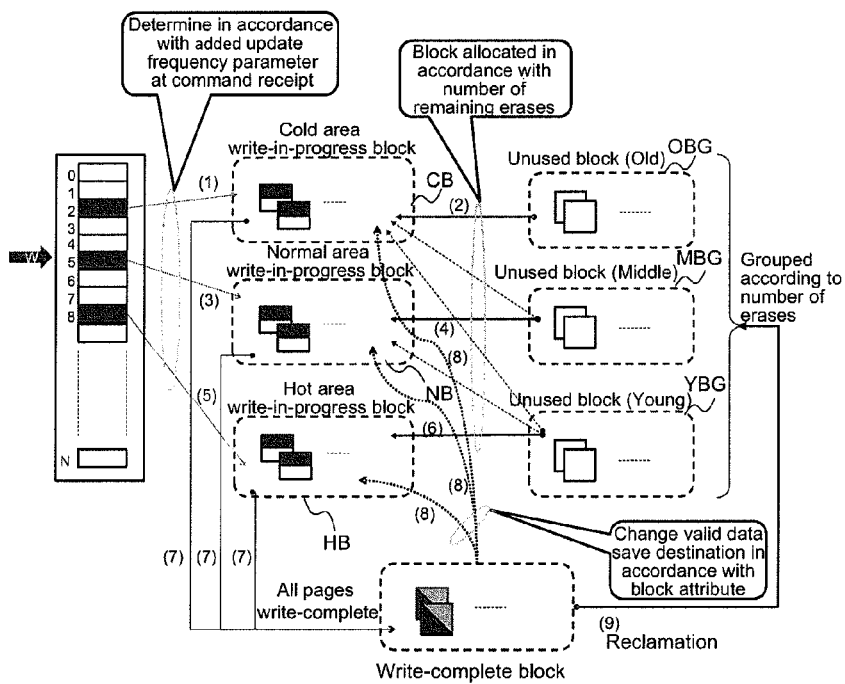
FIG. 33 is a diagram illustrating an overview of processing related to the fifth embodiment of the present invention.

FIG. 33 is a diagram illustrating an overview of processing related to the fifth embodiment of the present invention.

The FM controller 131 of the FMPK 130, upon receiving a write request (write command) from the host CPU 602 (802), determines whether the write data is data predicted to have a relatively low update frequency, data predicted to have a normal update frequency, or data predicted to have a relatively high update frequency based on the update frequency parameter of the specific field 902 in the command.

Then, the FM controller 131, in a case where it has been determined that the data is predicted to have a relatively low update frequency, stores the data in a Cold area write-in-progress block CB ((1) in the drawing). In a case where a Cold area write-in-progress block CB does not exist here, the FM controller 131 selects an unused block from the unused block (Old) group OBG, and allocates this unused block as the data write destination ((2) in the drawing). This makes it possible to consolidate data predicted to have a relatively low update frequency in the same block. Consolidating data predicted to have a relatively low update frequency in the same block like this lowers the likelihood that all the pages inside the block will become invalid. Therefore, in the reclamation process, which will be described further below, the likelihood of this block becoming the target of an erase can be lowered, and the likelihood of processing being carried out to save the valid pages remaining inside the block to another block can be lowered, making it possible reduce the wasteful use of pages by the same data being rewritten to another block.

Furthermore, the FM controller 131, in a case where it has been determined that the data is predicted to have a normal update frequency, stores the data in a Normal area write-in-progress block NB ((3) in the drawing). In a case where a normal area write-in-progress block NB does not exist here, the FM controller 131 selects an unused block from the unused block (Middle) group MBG and allocates this unused block as the data write destination ((4) in the drawing).

Furthermore, the FM controller 131, in a case where it has been determined that the data is predicted to have a relatively high update frequency, stores the data in a Hot area write-in-progress block HB ((5) in the drawing). In a case where a Hot area write-in-progress block HB does not exist here, the FM controller 131 selects an unused block from the unused block (Young) group YBG, which is the group of blocks having the largest number of erases remaining, and allocates this unused block as the data write destination ((6) in the drawing). This makes it possible to consolidate parity parts, which are predicted to have relatively high update frequencies, in the same block. Consolidating parity parts predicted to have relatively high update frequencies in the same block like this can complete writes to all the pages relatively quickly, and raise the likelihood of all the pages becoming invalid relatively quickly when the write-complete state is reached. Therefore, in the reclamation process, which will be described further below, there is no need to carry out processing to save the valid pages remaining inside the block to another block, making it possible reduce the wasteful use of pages by the same data being rewritten to another block once again.

In accordance with the FM controller 131 writing data to either the Cold area write-in-progress block CB, the Normal area write-in-progress block NB, or the Hot area write-in-progress block HB, this block is classified in the write-complete block group WBG when the writes to all of the pages in the block are complete ((7) in the drawing).

Furthermore, in a case where the reclamation process has started, the FM controller 131 selects from among the blocks in the write-complete block group WBG a block in which there are either no valid pages or few valid pages, and in a case where a valid page exists in the selected block, saves the relevant valid page to a write-in-progress block that has the same block attribute as the block attribute of the relevant block ((8) in the drawing). For example, in a case where the block attribute is Cold, the FM controller 131 saves the data to a Cold area write-in-progress block CB for which the block attribute is Cold, in a case where the block attribute is Normal, saves the data to a Normal area write-in-progress block NB for which the block attribute is Normal, and in a case where the block attribute is Hot, saves the data to a Hot area write-in-progress block HB for which the block attribute is Hot. This makes it possible to consolidate data having the same update frequency in the same block.

Next, after all the pages in the block have become invalid pages, the FM controller 131 erases all the data in the relevant block, changes the relevant block to an unused block, and groups the blocks together based on the number of erases ((9) in the drawing). This makes it possible to appropriately classify the respective blocks into multiple block groups in accordance with the remaining number of erases.

Figure 34:
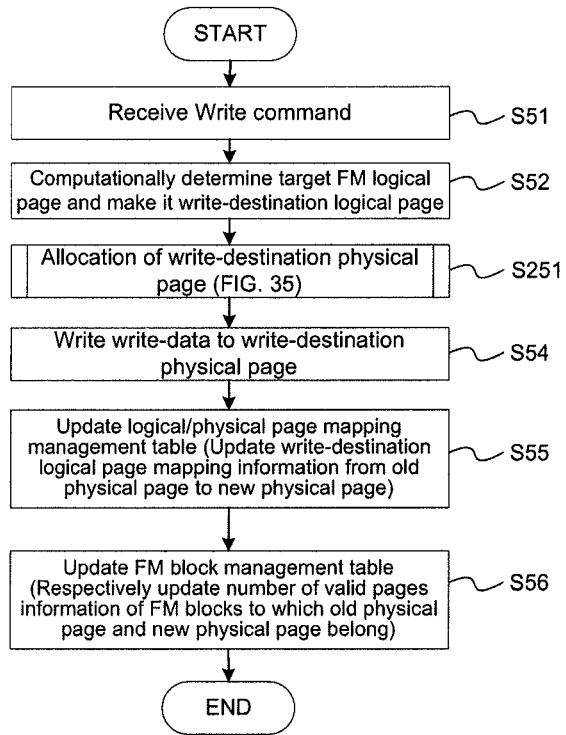
FIG. 34 is a flowchart of a write process in the FMPK related to the fifth embodiment of the present invention.

FIG. 34 is a flowchart of a FMPK write process related to the fifth embodiment of the present invention. In FIG. 34, the same reference signs are used with respect to the same parts as the write process related to the first embodiment shown in FIG. 14A.

In the write process related to the fifth embodiment, the write-destination physical page allocation process (FIG. 35) is executed subsequent to Step S52 (S251).

Figure 35:
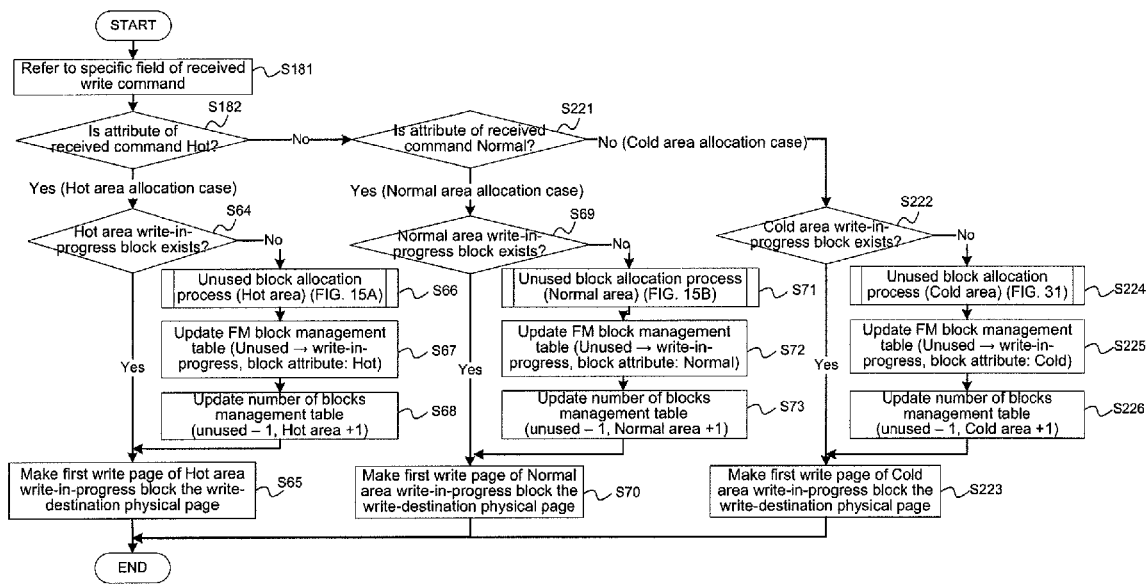
FIG. 35 is a flowchart of a write-destination physical page allocation process related to the fifth embodiment of the present invention.

FIG. 35 is a flowchart of the write-destination physical page allocation process related to the fifth embodiment of the present invention. Furthermore, in this drawing, the same reference signs are used with respect to the same parts as those of the write-destination physical page allocation process shown in FIGS. 14B, 22 and 30.

In the write-destination physical page allocation process related to the fifth embodiment, in a case where the result of the determination in Step S182 is that the attribute stored in the specific field 902 is not the Hot attribute (S182: No), the FM controller 131 determines whether or not the attribute stored in the specific field 902 is the Normal attribute (S221). In a case where the result is the Normal attribute (S221: Yes), the FM controller 131 executes the processing from Step S69, and in a case where the attribute is not the Normal attribute (S221: No), executes the processing from Step S222. According to this process, it is possible to either consolidate parity parts predicted to have a relatively high update frequency in the same block, or to consolidate data predicted to have a relatively low update frequency in the same block.

The preceding has been an explanation of the present invention based on the embodiments, but the present invention is not limited to the embodiments described hereinabove, and can be applied in a variety of other modes.

REFERENCE SIGNS LIST

100 Storage system
110 RAID controller
130 Flash memory package (FMPK)
131 FM controller

The invention claimed is:

1. A storage system, comprising:
multiple flash memory packages each having multiple flash memory chips, each including multiple physical blocks and a package controller for controlling access to data in a physical storage area of the flash memory chip and providing logical storage area, which is recognized by using multiple logical addresses, corresponding to the physical storage area, each of the multiple physical blocks is a unit of data erasure, and
a system controller configured to:
control the multiple flash memory packages as a RAID group,
send first RAID configuration information indicating that each of the logical addresses is related to store data or parity which is updated frequently rather than the data to each of the multiple flash memory packages before sending a write request to the multiple flash memory packages,
provide multiple Logical Units (LUs) based on the RAID group, the LUs based on the same RAID group including LUs whose stripe block size are different,
store the first RAID configuration information for managing a relationship between the RAID group and the LUs,
generate second RAID configuration information for each of Flash memory packages (FMPKs) based on the first RAID configuration information, the second RAID configuration information for a FMPK indicating a LU number, a LU start address, a stripe block size, a parity stripe block start location, a parity stripe block cycle, for each LU based on the FMPK, and
send the second RAID configuration information to each FMPK after configuring the LUs based on the FMPK and before sending a write request with respect to any of the LUs to the FMPK,
wherein each package controller receives the first RAID configuration information from the system controller and maintains the first RAID configuration information in the flash memory package,
each package controller receives a write request indicating a logical address to store write data from the system controller and is configured to determine whether the write data is data or parity based on the received logical address indicated in the received write request and the second RAID configuration information,
when the write data is parity which is not sent in association with data and which is updated more frequently than data, the package controller stores the write data into a physical block with a large remaining number of erasures in the flash memory chip of the flash memory package and
when the write data is data, the package controller stores the write data into a physical block with a small remaining number of erasures in the flash memory chip of the flash memory package.

2. A storage system according to claim 1, wherein
the RAID is configured in accordance with a plurality of the flash memory packages,
the higher-level apparatus has a memory for storing RAID configuration information denoting the configuration of the RAID,
the package controller receives as the frequency prediction information, from the higher-level apparatus, parity data determination information, which is information based on the RAID configuration and which enables a determination to be made as to whether the write-target data is RAID actual data, or RAID parity data for which the update frequency is predicted to be relatively high, and
determines, based on the parity data determination information, whether or not the write-target data is parity data, and in a case where the write-target data is parity data, exercises control so that this parity data is preferentially stored in the physical block with the large remaining number of erases.

3. A storage system according to claim 2, wherein the package controller exercises control so that data, which is predicted to have a relatively high update frequency, is stored in a physical block in which other data predicted to have a relatively high update frequency is stored.

4. A storage system according to claim 3, wherein the package controller exercises control so that in a case where a valid data-storing physical block becomes an erase target in a reclamation process, the valid data, which is data predicted to have a relatively high update frequency and which is stored in the physical block, is stored in a physical block in which other data predicted to have a relatively high update frequency is stored.

5. A storage system according to claim 4, wherein
the package controller classifies and manages the physical blocks of the flash memory chip in multiple groups based on the remaining number of erases, and, by allocating a physical block that is classified under a group of the largest remaining number of erases to the data predicted to have a relatively high update frequency, exercises control so that the data is preferentially stored in a physical block with the large remaining number of erases.

6. A storage system according to claim 5, wherein the storage system is a system having the higher-level apparatus therein.

7. A storage system according to claim 1, wherein
the higher-level apparatus includes frequency prediction information for write-target data in a write command for the write-target data, and sends the write command to the flash memory package, and
the package controller decides on a physical block in which the write-target data is stored, based on the frequency prediction information inside the write command.

8. A storage system according to claim 7, wherein
a RAID is configured in accordance with a plurality of the flash memory packages, and
the higher-level apparatus, in a case where the write-target data is RAID parity data, includes in the write command, as the frequency prediction information, high update frequency information, which denotes that the update frequency is high.

9. A storage system according to claim 7, wherein the higher-level apparatus, in a case where the write-target data is metadata, includes in the write command, as the frequency prediction information, high update frequency information, which denotes that the update frequency is high.

10. A storage system according to claim 7, wherein the higher-level apparatus, in a case where the write-target data is archive data, includes in the write command, as the frequency prediction information, low update frequency information, which denotes that the update frequency is low.

11. A storage system according to claim 1, wherein the package controller exercises control so that data, which is predicted to have a relatively low update frequency, is stored in a physical block in which other data predicted to have a relatively low update frequency is stored.

12. A storage system according to claim 11, wherein the package controller exercises control so that in a case where a physical block that stores data predicted to have a relatively low update frequency, which is valid, has become the erase target in a reclamation process, the valid data, which has been stored in the physical block, is stored in a physical block in which other data predicted to have a relatively low update frequency is stored.

13. A storage system according to claim 11, wherein the package controller classifies and manages the physical blocks of the flash memory chip under a plurality of groups based on the remaining number of erases, and exercises control so that, by allocating a physical block that is classified under a group with the least remaining number of erases to the data that is predicted to have a relatively low update frequency, the data is preferentially stored in a physical block with the small remaining number of erases.

14. A data control method in a storage system having multiple flash memory packages including multiple flash memory chips,
- each including multiple physical blocks and a package controller for controlling access to data in a physical storage area of the flash memory chip and providing logical storage area, which is recognized by using multiple logical addresses, corresponding to the physical storage area, each of the multiple physical blocks is an unit of data erasure,
- the data control method comprising:
- providing a system controller configured for:
    - controlling the multiple flash memory packages as RAID group,
    - sending first RAID configuration information indicating that each of the logical addresses is related to store data or parity which is updated frequently rather than the data to each of the multiple flash memory packages before sending write request to the multiple flash memory packages,
    - providing multiple Logical Units (LUs) based on the RAID group, the LUs based on the same RAID group including LUs whose stripe block size are different,
    - storing the first RAID configuration information for managing a relationship between the RAID group and the LUs,
    - generating second RAID configuration information for each of Flash memory packages (FMPKs) based on the first RAID configuration information, the second RAID configuration information for a FMPK indicating a LU number, a LU start address, a stripe block size, a parity stripe block start location, a parity stripe block cycle, for each LU based on the FMPK, and
    - sending the second RAID configuration information to each FMPK after configuring the LUs based on the FMPK and before sending a write request with respect to any of the LUs to the FMPK,
- wherein each package controller receives the first RAID configuration information from the system controller and maintaining the first RAID configuration information in the flash memory package,
- each package controller receiving a write request indicating a logical address to store write data from the system controller and determining whether the write data is data or parity based on received logical address indicated in the received write request and the second RAID configuration information,
- when the write data is parity which is not sent in association with data and which is updated more frequently than data, the package controller storing the write data into a physical block with a large remaining number of erasures in the flash memory chip of the flash memory package, and
- when the write data is data, the package controller storing the write data into a physical block with a small remaining number of erasures in the flash memory chip of the flash memory package.

* * * * *